US011592896B2

(12) United States Patent
Paez et al.

(10) Patent No.: US 11,592,896 B2
(45) Date of Patent: Feb. 28, 2023

(54) TECHNOLOGICAL INFRASTRUCTURE FOR ENABLING MULTI-USER COLLABORATION IN A VIRTUAL REALITY ENVIRONMENT

(71) Applicant: Wild Technology, Inc., Portland, OR (US)

(72) Inventors: Gabriel M. Paez, Portland, OR (US); Eric S. Hackborn, Portland, OR (US); Taylor A. Libonati, Bellevue, WA (US); Adam G. Micciulla, Portland, OR (US)

(73) Assignee: Wild Technology, Inc., Portland, OR (US)

( * ) Notice: Subject to any disclaimer, the term of this patent is extended or adjusted under 35 U.S.C. 154(b) by 591 days.

(21) Appl. No.: 16/675,504

(22) Filed: Nov. 6, 2019

(65) Prior Publication Data

US 2020/0142475 A1    May 7, 2020

Related U.S. Application Data

(63) Continuation of application No. 16/183,582, filed on Nov. 7, 2018, now abandoned.

(51) Int. Cl.
*G06F 3/01* (2006.01)
*G06F 3/04845* (2022.01)
(Continued)

(52) U.S. Cl.
CPC .............. *G06F 3/011* (2013.01); *G06F 3/017* (2013.01); *G06F 3/04842* (2013.01);
(Continued)

(58) Field of Classification Search
CPC ...... G06F 3/011; G06F 3/017; G06F 3/04842; G06F 3/04845; G06F 3/1454;
(Continued)

(56) References Cited

U.S. PATENT DOCUMENTS 6,570,563 B1 *   5/2003   Honda .................. G06F 16/444
                                                                345/473
6,629,065 B1     9/2003   Gadh et al.
(Continued)

OTHER PUBLICATIONS

Greenberg, S. and Marwood, D., "Real Time Groupware as a Distributed System: Concurrency Control and its Effect on the Interface," Research Report 94/534/03, Department of Computer Science, University of Calgary, Alberta, Canada, 1994.

*Primary Examiner* — Pei Yong Weng
(74) *Attorney, Agent, or Firm* — Fish & Richardson P.C.

(57) ABSTRACT

The present disclosure describes techniques for generating, maintaining, and operating a cooperative virtual reality (VR) environment across multiple computing devices. By utilizing these techniques, disparate users are able to work independently or in collaboration on projects within a single VR environment without the latency issues that plague prior VR environments. That is, unlike prior systems which are plagued with latency issues that interrupt the user's VR experience, the techniques described in the present disclosure allow for cooperative VR environments to be rendered in real time across large numbers of computing devices while enabling each computing device to provide a smooth user experience. Additionally, the techniques described herein distribute the data processing and analysis between the VR server and the individual computing devices rendering the cooperative VR environment.

17 Claims, 6 Drawing Sheets

(51) Int. Cl.
 *G06F 3/14* (2006.01)
 *G06F 3/04842* (2022.01)
 *G06F 16/29* (2019.01)
 *H04L 65/403* (2022.01)

(52) U.S. Cl.
 CPC ........ *G06F 3/04845* (2013.01); *G06F 3/1454* (2013.01); *G06F 16/29* (2019.01); *H04L 65/403* (2013.01)

(58) Field of Classification Search
 CPC ...... G06F 16/29; G06F 3/04815; G06F 3/147; H04L 65/403; G09G 2354/00; G09G 2360/04; G09G 2370/022
 See application file for complete search history.

(56) References Cited

U.S. PATENT DOCUMENTS

| | | | |
|---|---|---|---|
| 9,256,282 B2 | 2/2016 | Latta et al. | |
| 2009/0106669 A1* | 4/2009 | Winkler | G06Q 10/00 715/757 |
| 2009/0259948 A1 | 10/2009 | Hamilton, II et al. | |
| 2012/0264511 A1 | 10/2012 | Marsland et al. | |
| 2013/0047208 A1* | 2/2013 | Shuster | G06F 40/143 726/1 |
| 2015/0120834 A1 | 4/2015 | Maheshwari et al. | |

* cited by examiner

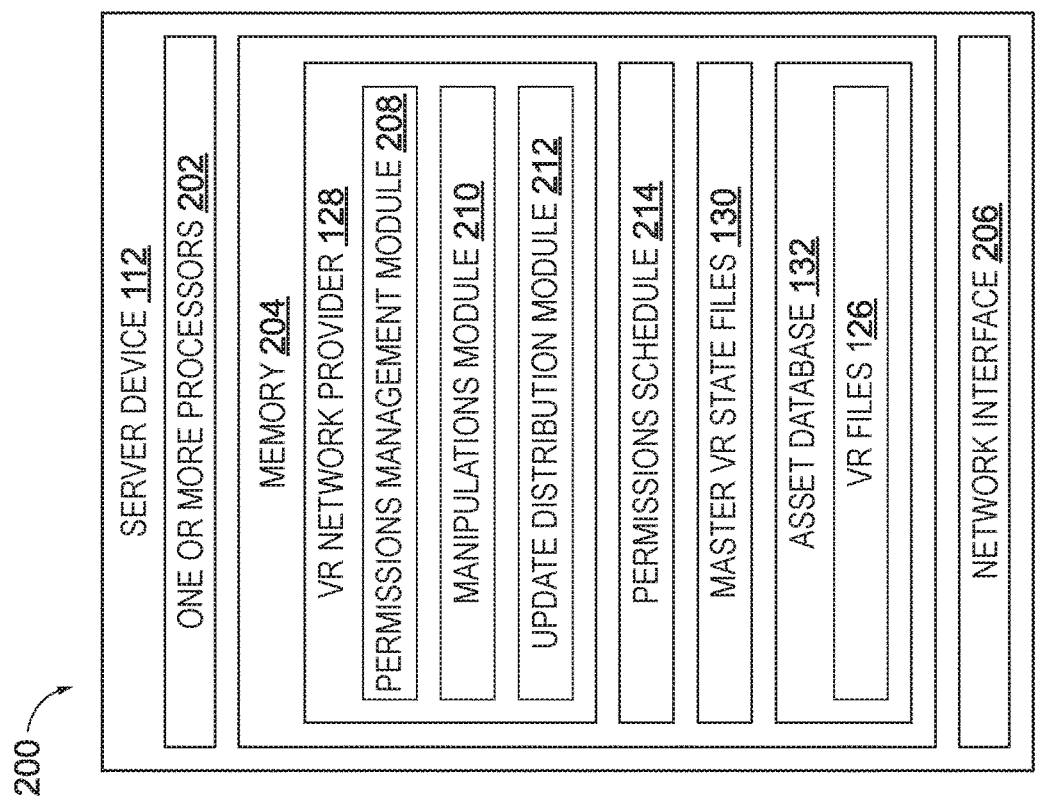

TECHNOLOGICAL INFRASTRUCTURE FOR ENABLING MULTI-USER COLLABORATION IN A VIRTUAL REALITY ENVIRONMENT

RELATED APPLICATION

The present application is a continuation patent application that claims priority under 35 U.S.C. § 120 to U.S. patent application Ser. No. 16/183,582, which is entitled "Technological Infrastructure for Enabling Multi-User Collaboration in a Virtual Reality Environment," was filed on Nov. 7, 2018, and the complete disclosure of which is hereby incorporated by reference.

FIELD

The present disclosure relates to computing devices, computing systems, and computing methods for generating, maintaining, and operating a virtual reality environment across multiple computing devices that enable disparate users to collaborate with reduced latency.

BACKGROUND

Due to technological improvements in computer processing and graphics rendering, computing systems capable of providing virtual reality (VR) environments are widely available. Because of this availability of VR capable systems, users desire VR solutions that enable them to perform individual and collaborative projects within VR environments. However, present VR environments are plagued with many technical issues. For example, current VR systems suffer from latency issues, where a noticeable delay occurs between a user action and a resultant change in the VR environment. In addition to causing a frustrating user experience, latency issues make collaboration via contemporaneous actions by different users impractical, or even impossible. Another technical issue effecting current VR environments is the lack of tools for converting user actions into changes within the VR environment. As a result, current computing systems struggle to convert sensor data relating to user gestures into the generation and manipulation of virtual objects/relationships within the VR environment.

BRIEF DESCRIPTION OF THE DRAWINGS

FIG. 2 is a schematic representation of a server device for generating, maintaining, and operating a cooperative VR environment across multiple computing devices.

FIG. 3 is a schematic representation of a computing device for generating, maintaining, and operating a cooperative VR environment across multiple computing devices.

DESCRIPTION

Figure 1:
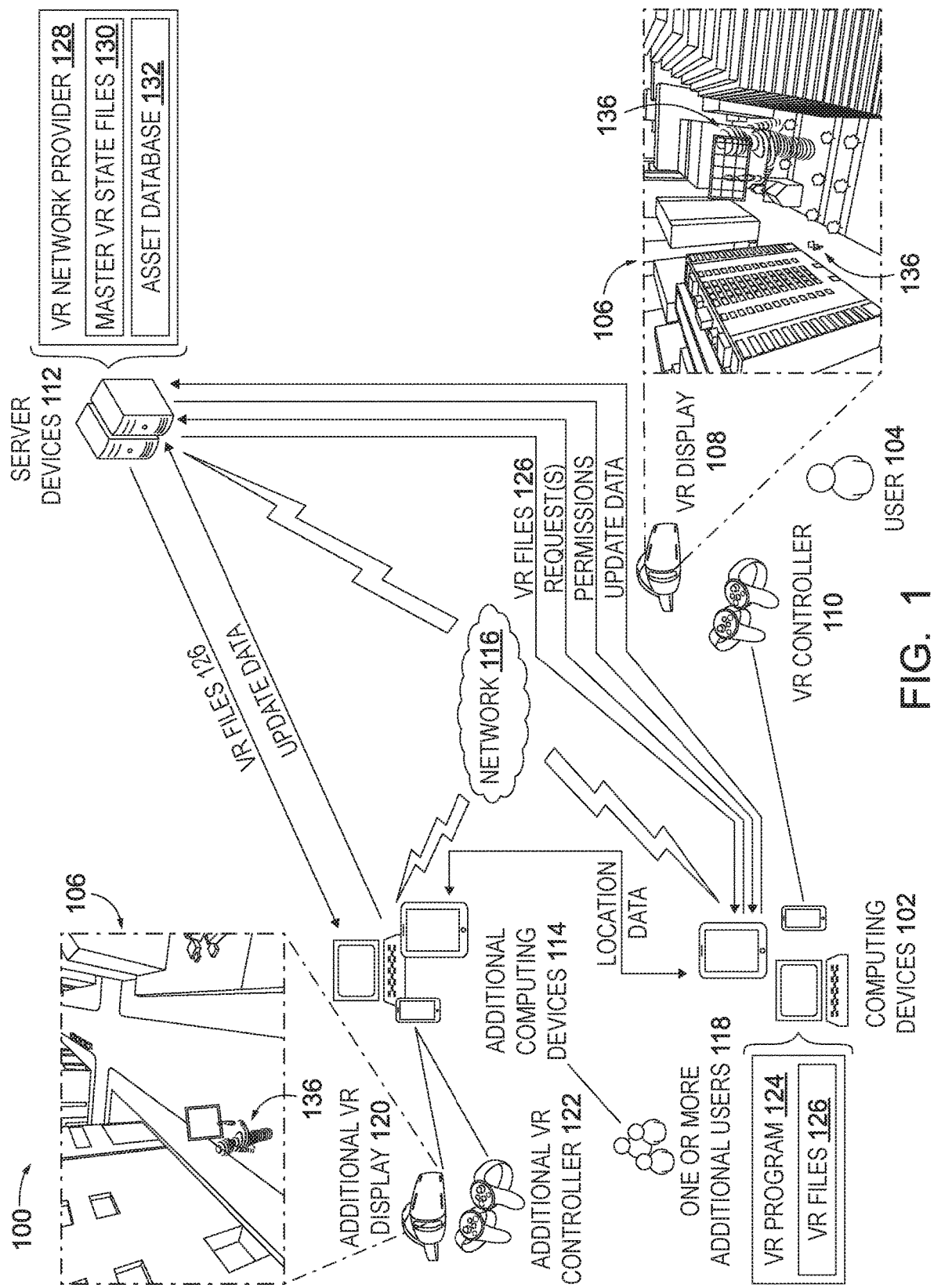
FIG. 1 is schematic drawing of an example environment that illustrates techniques for generating, maintaining, and operating a cooperative VR environment across multiple computing devices.

The present disclosure describes techniques for generating, maintaining, and operating a cooperative virtual reality (VR) environment across multiple computing devices. By utilizing these techniques, disparate users are able to work independently or in collaboration on projects within a single VR environment without the latency issues that plague prior VR environments. That is, unlike prior systems which are plagued with latency issues that interrupt use of a VR experience, the techniques described in the present disclosure allow for cooperative VR environments to be rendered in real time across large numbers of computing devices while enabling each computing device to provide a smooth user experience. Additionally, as will be discussed further below, the techniques described herein distribute the data processing and analysis between the VR server and the individual computing devices rendering the cooperative VR environment. Not only does this reduce the processing cost at any individual location, but it also allows for each individual computing device to provide a smooth cooperative VR experience that is not interrupted by lag events from other computing devices.

FIGS. 1-7 illustrate examples of computing systems, network-connected computing devices, and methods for generating, maintaining, and operating a cooperative virtual reality (VR) environment across multiple computing devices. In general, in the drawings, elements that are likely to be included in a given examples are illustrated in solid lines, while elements that are optional or alternatives are illustrated in dashed lines. However, elements that are illustrated in solid lines are not essential to all examples of the present disclosure, and an element shown in solid lines may be omitted from a particular example without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or utilized with any of the figures without departing from the scope of the present disclosure.

FIG. 1 is schematic drawing of example environments 100 that illustrate techniques for generating, maintaining, and operating a cooperative VR environment 106 across multiple computing devices, according to the present disclosure. Additional details of individual operations illustrated in FIG. 1 and discussed below are described in more detail with reference to subsequent figures.

The environment 100 includes a network-connected computing device 102 associated with a user 104. User 104 associated with the computing device 102 may include an individual that uses, owns, or otherwise interacts with the computing device 102, such as the device owner, family member, account holder, and/or another user. The computing device 102 may include many different types of electronic devices, including but not limited to, a personal computer, a laptop computer, a tablet computer, a VR computing system, a portable digital assistant (PDA), a smartphone, a wearable computing device, a game console, a set-top box, a smart television, a portable game player, a portable media player, and so forth. The computing device 102 is a computing device configured to render a cooperative VR environment 106 for presentation on a VR display 108. The VR display 108 may include a computer display, a dedicated VR headset, a head mounted display, a smartphone display, etc. In some embodiments, the VR display 108 may be a component of the computing device 102. Alternatively, the VR display 108 may be a separate device that is connected to the computing device 102 via a wired or wireless connection. For example, the computing device 102 may cause the cooperative VR environment 106 to be rendered on a screen of a VR headset so as to provide the user 104 wearing the VR headset with an immersive experience within the cooperative VR environment 106.

The computing device 102 also is configured to receive user inputs and/or user interactions from one or more VR controllers 110 that are connected to the computing device 102 via a wired or wireless connection. For example, the user 104 may use the one or more VR controllers 110 to provide user inputs and or interactions that correspond to manipulations of assets (i.e., objects, structures, textures, materials, groups, etc.) by the user 104 within the cooperative VR environment 106. In various embodiments, the VR controllers 110 may include a keyboard, a joystick, a game controller, a rudder, a treadmill, a touchpad, a computer mouse, a wearable device, etc. A user input may correspond to a gesture, a selection of a VR controller 110 element, or a combination thereof. A gesture corresponds to a position of a VR controller, a movement of a VR controller, an orientation of a VR controller, a change of orientation of a VR controller, or a combination thereof. Examples of a selection of a VR controller 110 element include a pulling of a trigger, pressing of a button, translation along a surface of a touchpad, movement of a roller, movement of a joystick, turning of a wheel, etc.)

The computing device 102 may be in communication with one or more server devices 112 and one or more additional computing device(s) 114 via network 116. Network 116 may be a wired network, a wireless network, or a combination of both. Examples of network 116 include the internet, a wide area network, a local area network, or a combination thereof. The additional computing device(s) 114 may be individually associated with one or more additional users 118, one or more additional VR displays 120, and one or more additional VR controllers 122.

The one or more additional computing device(s) 114 are computing devices that are configured to render the cooperative VR environment 106 for presentation on associated additional VR display(s) 120, and receive user inputs and/or user interactions from one or more additional VR controllers 122 that are connected to corresponding additional computing device(s) 114 via a wired or wireless connection. Within the present disclosure, the computing device 102 and the one or more additional computing device(s) 114 may be described as a first computing device and one or more second computing devices. In various embodiments, one or more additional computing device(s) 114 may include one or more of many different types of electronic devices, including but not limited to, a personal computer, a laptop computer, a tablet computer, a VR computing system, a PDA, a smartphone, a wearable computing device, a game console, a set-top box, a smart television, a portable game player, a portable media player, and so forth. Moreover, the additional VR displays 120 may include computer displays, dedicated VR headsets, head mounted displays, smartphone displays, etc. The additional VR controller(s) 122 may include a keyboard, a joystick, a game controller, a rudder, a treadmill, a touchpad, a computer mouse, a wearable device, etc. For example, an individual additional computing device 114 may render the cooperative VR environment 106 on a screen of a smartphone configured to provide an additional user 118 a VR experience, and receive user inputs and/or user interactions via an associated additional VR controller 122.

As shown in FIG. 1, the computing device 102 and the additional computing device(s) 114 store a VR program 124 and one or more VR files 126. The VR program 124 is executable by the computing device 102, and configured to cause the computing device 102 to provide a cooperative VR environment 106 to the user 104 using the one or more VR files 126. The VR files 126 may include model data, 3D mesh data, asset data, state data, VR format files, or one or other data assemblies indicating information for enabling the computing device 102 to render and/or interact with the cooperative VR environment 106 or component elements thereof (e.g., objects, structures, textures, materials, groups, etc.). For example, the VR files 126 may include a file that corresponds to a stored collection of coded instructions for rendering the cooperative VR environment 106 and/or the assets within the VR environment 106. Such a file may describe the dimensions, positions, orientations, textures, materials, groupings, or other characteristics of individual component elements of the cooperative VR environment 106. Alternatively, or in addition, the VR files 126 may include an asset file that corresponds to a stored collection of coded instructions for rendering an associated asset within the cooperative VR environment 106.

In some embodiments, one or more of the same VR files 126 are stored on the computing device 102 and one or more of the additional computing device(s) 114. Alternatively, or in addition, the computing device 102 may store a VR file 126 that is not stored on the additional computing device(s) 114. For example, each of the computing device 102 and the additional computing device(s) 114 may store a file for rendering the cooperative VR environment 106, while only the computing device 102 stores a menu file for rendering an interactive graphical user interface for accessing an asset library of a user account associated with the user 104. The VR files 126 may be received from the server device(s) 112, and may be partially or completely generated by the computing device 102, one or more additional computing device(s) 114, or via collaboration between the computing device 102 and one or more additional computing device(s) 114.

As further illustrated in FIG. 1, the server device(s) 112 host a VR network provider 128 that utilizes master VR state files 130 and an asset database 132 to enable the computing device 102 and additional computing device(s) 114 to render the cooperative VR environment 106. The VR network provider 128 is executable by the server device(s) 112, and configured to cause the server device(s) 112 to manage permissions, data transfers, updates, and distribution of asset data between the computing device 102 and the additional computing device(s) 114. In this way, each of the computing device 102 and the additional computing device(s) 114 are each able to provide a cooperative VR environment 106 that allows collaboration between multiple users while also providing a smooth VR experience.

The master VR state files 130 may be data assemblies indicating the state of the cooperative VR environment 106. For example, the master VR state files 130 may identify the assets that are included within the cooperative VR environment 106, the characteristics of these assets model data, 3D mesh data, asset data, state data, VR format files, or one or other data assemblies indicating dimensions, positions, orientations, textures, materials, groupings, or other information for rendering and/or interacting with the cooperative VR environment 106 or component elements thereof. In some embodiments, the master VR state files 130 further may include links to VR files 126 within the asset database 132 that are associated with assets within the cooperative VR environment 106.

The asset database 132 corresponds to a stored collection of master versions of the VR files 126 for rendering and/or manipulating one or more assets. For example, the asset database 132 may include data describing texture patterns, 3D models for rendering assets in VR, characteristics of the assets (e.g., how an asset can be manipulated, how the asset interacts with other assets, how the asset interacts with the cooperative VR environment 106, etc.), groupings of assets, or a combination thereof. In some embodiments, the asset database 132 stores the master version of all VR files 126 for the cooperative VR environment 106 and/or the assets therein. In some embodiments, the asset database 132 may include links that indicate particular cooperative VR environments 106 that individual assets are included within. Additionally, in some embodiments, the asset database 132 may include one or more sub databases that are associated with one or more user accounts associated with the user 106, one or more additional users 118, or a combination thereof.

In some embodiments, the VR network provider 128 is configured to allow master versions of the VR files 126 stored in the asset database 132 to be modified so that the corresponding asset becomes a modified version of the asset. Where the asset database 132 also includes links that indicate particular cooperative VR environments 106 that individual assets are included within, an edit of a master version of a VR file also may cause the server device(s) 112 to transmit update data to each computing device 102 and additional computing device associated with a cooperative VR environments 106 that includes the modified asset. The update data may cause these computing devices to render their respective cooperative VR environments 106 as including the modified version of the asset. Moreover, where the modification of the VR files 126 correspond to a removal of the master versions of the VR files 126 associated with a particular asset from the asset database 132, the update data may cause these computing devices to render their respective cooperative VR environments 106 as not including the particular asset.

FIG. 1 further illustrates an example of a process that may be utilized to generate, maintain, and operate a cooperative VR environment 106 across multiple computing devices, according to the present disclosure.

This process may begin by the VR network provider 128 causing the server device(s) 112 to transmit one or more VR files 126 for rendering the cooperative VR environment 106 to the computing device 102. This process may be initiated by the VR program 124 on the computing device 102 requesting to access the cooperative VR environment 106. For example, in response to the computing device 102 receiving a user input corresponding to a selection to enter the cooperative VR environment 106, the computing device 102 may transmit a request to the server device(s) 112 for the VR files 126.

The VR network provider 128 also may cause the server device(s) 112 to transmit one or more VR files 126 for rendering the cooperative VR environment 106 to an additional computing device 114. This process may be initiated by the VR program 124 on the additional computing device 114 requesting to access the cooperative VR environment 106. For example, in response to the additional computing device 114 receiving a user input corresponding to a selection to enter the cooperative VR environment 106, the additional computing device 114 may transmit a request to the server device(s) 112 for the VR files 126. In some embodiments, the VR files 126 received by the computing device are the same as the VR files 126 received by the additional computing device 114. Alternatively, or in addition, one or more of the VR file 126 received by the computing device may be different from the VR files 126 received by the additional computing device 114. For example, where the computing device 102 and the additional computing device 114 are different types of computing devices and/or utilize different operating systems, each of the computing device 102 and the additional computing device 114 may receive a version of a VR file 126 that is optimized and/or otherwise configured to be executed by the device type/operating system of the corresponding device.

The VR program 124 executing on the computing device 102 then causes the computing device 102 to render the cooperative VR environment 106 on the VR display 108. The VR program 124 causes the cooperative VR environment 106 to be rendered on the VR display 108 such that the user 104 is provided with an immersive experience within the cooperative VR environment 106. For example, based on the VR files 126, the computing device 102 may render the VR environment 106 as including assets such as structures, objects, textures, and groupings thereof. The computing device 102 renders the cooperative VR environment 106 on the VR display 108 using location information describing a virtual position of the user 104 within the cooperative VR environment 106. In this way, the computing device 102 is able to render the cooperative VR environment 106 on the VR display 108 such that the user 104 is presented with a perspective of the cooperative VR environment 106 consistent with the user's 104 virtual position within the cooperative VR environment 106.

For example, VR files 126 may include data associated with an object within the cooperative VR environment 106, such as model data that describes the geometric properties of the object, a virtual positioning of the object within the cooperative VR environment 106, orientations of the object within the cooperative VR environment 106, characteristics of the object, how the object interacts with the cooperative VR environment 106 or other objects within the cooperative VR environment 106, how the object can be manipulated by the computing device 102, etc. Thus, by utilizing the VR files 126, the computing device 102 is able to locally render the object, object interactions, and/or modifications of the object within the cooperative VR environment 106 without needing further data transmission from the server device(s) 112. Because the VR files 126 are stored locally on the computing device 102, the computing device is able to quickly render the object, or subsequent interactions and/or modifications relating to the object in real time without needing to exchange data with the server device(s) 112. This allows the computing device 102 to provide the user 104 with a smooth and responsive virtual experience within the cooperative VR environment 106, even when experiencing network connectivity or data transmission issues.

Additionally, a corresponding VR program 124 executed on the additional computing device(s) 114 causes the additional computing device(s) 114 to render the cooperative VR environment 106 on corresponding additional VR displays 120 based on the VR files 126. For example, based on the VR files 126, the additional computing device 114 may render the cooperative VR environment 106 as including assets such as structures, objects, textures, groupings, etc. so that associated additional users 118 may utilize the corresponding additional VR displays 120 to experience an immersive experience within the cooperative VR environment 106. The additional computing device 114 renders the cooperative VR environment 106 on the additional VR display 120 using location information describing a virtual position of a corresponding user 118 within the cooperative VR environment 106.

In some embodiments, the computing device 102 transmits location data 134 to the additional computing device 114 that indicates positional information relating to the virtual location of the user 104 and/or the VR controllers 110 within the cooperative VR environment 106. Alternatively or in addition, at least one additional computing device 114 also transmits location data 134 to the computing device 102 that indicates positional information relating to the virtual location of a corresponding additional user 118 and/or additional VR controller(s) 122 within the cooperative VR environment 106. The positional information may be transmitted directly between the computing device 102 and the additional computing device 114, may be transmitted via the server device(s) 112, or a combination thereof.

The computing device 102 may then utilize the location data 134 received from the additional computing device 114 to render a dynamic avatar 136 that represents a virtual representation of the additional user 118 within the cooperative VR environment 106. The location and characteristics of the dynamic avatar 136 may be re-rendered as new location data 134 is received from an associated additional computing device 114. For example, in response to the computing device 102 receiving location data 134 that indicates that a position of an additional VR controller 122 has moved to a new virtual location, the computing device 102 renders a corresponding limb or other corresponding characteristic of the dynamic avatar 136 as being located in the new virtual location within the cooperative VR environment 106. Similarly, the additional computing devices 114 may use the location data 134 transmitted from the computing device 102 to render dynamic avatars 136 representing the user 104 within the cooperative VR environment 106.

In some embodiments, the location data 134 further may identify a VR tool (e.g., shape adjustment tool, menu tool, translational tool, asset creation tool, etc.) that the corresponding additional user 118 is currently using, a task that the additional user 118 is currently performing, an asset that the additional user 118 is currently manipulating, etc. The computing device 102 can utilize the location data 134 to render the interactions between the dynamic avatar 136 and the cooperative VR environment 106. For example, based on an additional computing device 114 transmitting location data 134 that identifies that a corresponding additional user 118 has accessed an interactive graphical user interface for accessing an asset library, the computing device 102 may render a visual representation of the graphical user interface, as well as a dynamic avatar 136 that moves in correspondence with the additional user's 118 interactions with the graphical user interface. In another example, where the additional computing device 114 transmits location data 134 that identifies that a corresponding additional user 118 has selected to use a VR tool for translating an object, the computing device 102 may render a visual representation of the VR tool in an appendage of a dynamic avatar 136 that moves in correspondence with the additional user's 118 interactions with the graphical user interface. Alternatively or in addition, the computing device 102 may render a dynamic visual representation of the object that reflects the manipulations of the object by the additional computing device 114 in real time based on the location data 134.

In some embodiments, such dynamic visual representations may include one or more animated and/or static abstract symbols (e.g. arc segments, arrows, lines, dots, etc.) that indicate a virtual position, scale, and/or orientation of the manipulated avatar after and/or during the previewed movement. Providing a preview through use of symbols, may provide the benefit of increasing the comfort (e.g. avoiding the induction of motion sickness, etc.) of VR users, compared to dynamically previewing a new perspective of the user corresponding to the manipulated avatar, and may be less confusing to users witnessing the previewed manipulations. In this way, the computing device 102 is able to render visual representations of the actions that the additional users 118 are performing within the cooperative VR environment 106.

The computing device 102 and the additional computing device 114 may render the dynamic avatars 136 as new location data 134 is received. In this way, the dynamic avatars 136 are periodically updated in correspondence with the connection between the computing device 102 and the additional computing device 114. In this way, a lag event of an individual network connection of the computing device 102 or the additional computing device 114, or a loss of a network connection there between only results in the corresponding dynamic avatars 136 as rendered within the cooperative VR environment 106 not being re-rendered to show movement, without effecting the rendering of the cooperative VR environment 106 as a whole. This allows the system described in the environment 100 to provide user 102 and additional users 118 with a more stable VR experience.

The computing device 102 then receives update data from the server device(s) 112 that identifies alterations of the cooperative VR environment 106 and/or assets within the cooperative VR environment 106. In this way, the update data enables the computing device 102 to render an updated version of the cooperative VR environment 106 that matches the cooperative VR environment 106 rendered by the additional computing device(s) 114. The alterations identified by the update data may have been generated by one or more of the server devices 112, the additional computing device(s) 114, the computing device 102, or a combination thereof. In some embodiments, these updates are received at or near real time as they are made. As the cooperative VR environment 106 and/or assets within the cooperative VR environment 106 are altered by individual (or combinations of) computing devices, update data is transmitted by these devices to the server device(s) 112, which then update the master VR state files 130 to reflect the current state of the cooperative VR environment 106 and the assets within. When changes are made to the master VR state files 130, the server device(s) 112 then transmits update data to each of the computing device 102 and the additional computing device(s) 114 so that each of the computing devices are able to then render an updated version of the cooperative VR environment 106. In this way, a uniform version of the cooperative VR environment 106 is rendered across each of the computing device 102 and the additional computing device(s) 114. For example, based upon an additional computing device 114 receiving user input from corresponding additional VR controller(s) 122, the additional computing device 114 may determine that the user input corresponds to a change of a particular surface within the cooperative VR environment 106 from a first texture to a second texture.

Based on this determination, the additional computing device 114 then sends update data to the server device(s) 112 that describes this texture change, which the server device(s) 112 utilizes to update the master VR state files 130 to reflect the particular surface now has the second texture. The server device(s) 112 then distributes update data to the computer device 102 and the additional computing device 114 that identifies that the particular surface now has the second texture. In this way, each of the computer device 102 and the additional computing device 114 can then render an updated version of the cooperative VR environment 106 in which the particular surface has the second texture.

In order to improve the ability of the computing device 102 and the additional computing device(s) 114 to smoothly render the cooperative VR environment 106, the computing device 102, additional computing device(s) 114, and/or the server device(s) 112 may utilize different types of data streams to transmit different types of data. In some embodiments, VR files 126 and updates relating to the state of the cooperative VR environment 106 and/or the assets within the VR environment 106 may be transmitted over a highly reliable data stream (e.g., a transmission control protocol (TCP)), while location data 134 may be transmitted over a less reliable data stream (e.g., a user datagram protocol (UDP)). By splitting up the transmission of data in this way, the system described herein enables the computing device 102 to render real time while minimizing the effect of a lag event of an individual network connection of an additional computing device 114, as such a lag event would not affect the ability of the computing device 102 to render the most up to date version of the cooperative VR environment 106. Rather, a lag of an individual network connection of an additional computing device 114 would only result in an individual avatar within the cooperative VR environment 106 not being updated.

In some embodiments, the server device(s) 112 also may prioritize the data that is transmitted within individual streams. For example, when distributing update data that describes alterations of the cooperative VR environment 106, the server device(s) 112 may stream update data that relates to assets that are proximate to the virtual location of the user 104 within the cooperative VR environment 106, and/or within the perspective view of the user 104 within the cooperative VR environment 106 before streaming update data that relates to assets that are not proximate to the virtual location of the user 104 and/or not within the perspective view of the user 104. Alternatively or in addition, the server device(s) 112 may stream data relating to a hierarchy. For example, the server device(s) 112 may stream update data relating to an alteration of a building within the virtual location of the user 104, before transmitting update data relating to an alteration of a room within the building, which may be transmitted before transmitting update data relating to an alteration of a piece of furniture within the room.

Additionally, to facilitate collaboration between disparate computing devices, the server device(s) 112 manages the editing permissions within the cooperative VR environment 106. Specifically, to prevent situations where different users perform incompatible alterations of the cooperative VR environment, and/or the assets within, the server device(s) 112 manages the ability of each of the computing device 102 and the additional computing device(s) 114 to manipulate the cooperative VR environment 106, and/or the assets within, according to a permission schedule. The permission schedule may correspond to a data file, table, database, or other data structure that identifies the permissions status of individual assets within the cooperative VR environment 106. The permission status of an asset may include, but is not limited to, any one of: available for manipulation, available for manipulation of a particular type, locked for manipulation (i.e., currently being manipulated by a computing device and not available for manipulation by another user), locked for manipulation of a particular type (and not available for manipulation of the same type by another user), etc. For example, in response to the computing device 102 receiving a user input data from one or more VR controllers 110 that the VR program 124 determines corresponds to a selection and/or manipulation of the asset within the cooperative VR environment 106, the VR program 124 then causes the computing device 102 to transmit to the server device(s) 112 a request to manipulate the asset. Upon receiving the request to manipulate the asset, the VR network provider 128 causes the server device(s) 112 to determine the permission status of the associated asset.

Where the server device(s) 112 determine that the asset that the computing device 102 is requesting to manipulate is available for manipulation, and/or is available for manipulation of a same type as the type of manipulation that the computing device 102 is requesting to perform, the VR network provider 128 causes the corresponding asset to be locked for manipulation by the computing device 102, and then transmits permission data indicating that the computing device 102 has been assigned permission to perform the requested manipulation. Alternatively, if the VR network provider 128 determines that the asset that the computing device 102 is requesting to manipulate is not available for manipulation, and/or is not available for manipulation of a same type as the type of manipulation that the computing device 102 is requesting to perform, the VR network provider 128 causes the server device(s) 112 to transmit a notification that the computing device does not have permission to perform the requested manipulation.

In response to receiving the notification that the computing device 102 has been assigned permission to perform the request manipulation of the asset, the computing device 102 manipulates the asset based on user inputs received from the VR controllers 110. In some embodiments, the VR program 124 causes the computing device 102 to render a visual or auditory signal that the user 104 is able to perform the manipulation. For example, the computing device 102 may render the cooperative VR environment 106 such that the asset is dynamically responsive to inputs from the VR controllers 110. In some embodiments, while the user 104 is dynamically manipulating the asset, data indicating the dynamic manipulations are streamed to the additional computing device 114 as location data 134. Once the computing device 102 receives a user input from the VR controllers 110 that corresponds to a finished manipulation of the asset, the VR program 124 causes the computing device 102 to transmit state data that indicates that the asset has been manipulated to become a modified version of the asset. For example, the state data may describe at least one of positional information and dimensional information of the modified version of the asset within the cooperative VR environment 106.

When received by the server device(s) 112, the state data may cause the VR network provider 128 to update the master VR state files 130 so that they reflect that the current state of the asset within the cooperative VR environment 106 corresponds to the modified version of the asset. The VR network provider 128 then causes the server device(s) 112 to transmit update data to each of the additional computing device(s) 114 so that each of the computing devices is able to then render an updated version of the cooperative VR environment 106. In this way, each additional user 118 is provided with a rendered virtual experience within an identical version of the cooperative VR environment 106. In some embodiments, the state data further may cause the VR network provider 128 to modify the permission status of the asset to reflect that the computing device 102 no longer has permission to manipulate the asset.

In some embodiments, the manipulation of the asset within the cooperative VR environment 106 by the computing device 102 may correspond to a translation, rotation, or scaling of a dynamic avatar 136 of an additional user 118. In such embodiments, the VR network provider 128 may cause the server device(s) 112 to transmit update data to the particular additional computing device 114 associated with the manipulated dynamic avatar 136 that causes the particular additional computing device 114 to render the cooperative VR environment 106 such that the perspective of the cooperative VR environment 106 presented on the corresponding additional VR display 120 is modified in correspondence with the translation of a dynamic avatar 136 by the computing device 102. In some embodiments, manipulations of a dynamic avatar 136 of an additional user 118, may result in server device(s) 112 transmitting update data to an additional computing device 114 associated with the manipulated dynamic avatar 136 that causes the additional computing device 114 to render one or more animated and/or static abstract symbols (e.g. arc segments, arrows, lines, dots, etc.) indicating a virtual position, scale, and/or orientation of the manipulated dynamic avatar 136 after the previewed movement. Alternatively, or in addition, computing device 102 may transmit an identifier associated with the type of manipulation within the location data 134 transmitted to the additional computing device 114. In this way, the additional computing device 114 may use the identifier and the location data 134 to render a preview of the manipulation by the computing device 102 through use of symbols. Providing a preview through use of symbols may provide the benefit of increasing the comfort (e.g. avoiding the induction of motion sickness, etc.) of VR users, compared to dynamically previewing a new perspective of the user corresponding to the manipulated avatar, and may be less confusing to users witnessing the previewed manipulations.

Similarly, if the manipulation of the asset within the cooperative VR environment 106 by the computing device 102 corresponds to a manipulation of a group of assets that includes the dynamic avatar 136, the server device(s) 112 may transmit update data to the particular additional computing device 114 associated with the manipulated dynamic avatar 136 that causes the particular additional computing device 114 to render the cooperative VR environment 106 such that the perspective of the cooperative VR environment 106 presented on the corresponding additional VR display 120 is modified in correspondence with the translation of the group of assets by the computing device 102.

Alternatively, in response to receiving the notification that the computing device 102 has not been assigned permission to perform the requested manipulation of the asset, the VR program 124 causes the computing device 102 to cause a combination of one or more visual, auditory, or haptic signals to be provided to the user 104 such that the user 104 is informed that the computing device 102 is not able to perform the manipulation.

In some embodiments, the VR network provider 128 enables user 104 and one or more additional users 118 to perform collaborative manipulations on a single asset. That is, the VR network provider 128 may allow for a single asset to be manipulated by contemporaneous user inputs from a plurality of users. For example, the VR network provider 128 may enable two or more users to collaboratively modify an object (e.g., resize the object, reorient the object, reposition the object, distort the object, deform the object, change features of the object, change characteristics of the object, etc.) based on a first set of user inputs from user 104 and a second set of user inputs from one or more additional users 118. Such a collaborative manipulation may be initiated by the computing device 102 receiving a first user input from a VR controller 110 and the additional computing device 114 receiving a second user input from a corresponding additional VR controller 122, wherein each of the first user input and the second user input correspond to a request to collaboratively manipulate an asset within the cooperative VR environment 106. For example, the additional computing device 114 may receive a user input corresponding to a selection to collectively manipulate an object within the cooperative VR environment 106 as rendered by the additional computing device 114, while the computing device 102 receives a user input corresponding to a selection to collectively manipulate the same object within the cooperative VR environment 106 as rendered by the computing device 102. In some embodiments, each of the computing device 102 and the additional computing device 114 may transmit a request to collaboratively manipulate the asset with the other computing device. Alternatively, in some embodiments one of the computing device 102 and the additional computing device 114 may transmit a single request to collaboratively manipulate the asset with the other computing device. This single request may include a data identifying that the computing device 102 has received a first user input from a VR controller 110 that corresponds to a request to collaboratively manipulate the asset with the additional computing device 114, or the VR network provider 128 may determine that the request corresponds to a request to collaboratively manipulate the asset with the additional computing device 114 based on contextual information about the request (e.g., locations of the users in the cooperative VR environment, actions of the corresponding users in the environment, etc.).

Upon receiving the request to collaboratively manipulate the asset, the VR network provider 128 causes the server device(s) 112 to determine the permission status of the associated asset. Where the server device(s) 112 determine that the asset is available for collaborative manipulation, and/or is available for collaborative manipulation of a same type as the type of manipulation that the computing device 102 and additional computing device 114 are requesting to perform, the VR network provider 128 causes the corresponding asset to be locked for collaborative manipulation by a selected device of the computing device 102 and the additional computing device 114.

The VR network provider 128 then causes the server device(s) 112 to transmit permission data to the selected device of the computing device 102 and the additional computing device 114 that the selected device has been assigned permission to perform the requested collaborative manipulation. Additionally, in some embodiments the VR network provider 128 also causes the server device(s) 112 to transmit permission data to the computing device that was not selected that indicates that the selected computing device was assigned permission to collaboratively manipulate the asset.

If the server device 112 assigns permission to collaboratively manipulate the asset to the computing device 102, the computing device 102 collaboratively manipulates the asset based on user inputs received from the VR controllers 110 and user inputs received by the additional computing device 114 from the additional VR controller(s) 122. The computing device 102 may receive user inputs received by the additional computing device 114 via the location data 134 received from the additional computing device 114. In some embodiments, the VR program 124 causes the computing device 102 to render the cooperative VR environment 106 such that the asset is dynamically responsive to both first user inputs from the VR controllers 110 and second user inputs from the additional VR controller(s) 122.

In some embodiments, while the user 104 is dynamically collaboratively manipulating the asset, data indicating the dynamic collaborative manipulations are streamed to the additional computing device 114. For example, the computing device 102 may transmit the data indicating the dynamic collaborative manipulations to the additional computing device as location data 134. The additional computing device 114 may use the data indicating the dynamic manipulations in combination with the user inputs received from the additional VR controller(s) 122 to dynamically render a visual representation of the collaborative manipulations collectively performed on the asset by the computing device 102 and the additional computing device 114. Once the computing device 102 receives user inputs from the VR controllers 110 and the additional VR controller(s) 122 that correspond to a finished collaborative manipulation of the asset, the VR program 124 causes the computing device 102 to transmit state data that indicates that the asset has been collaboratively manipulated to become a collaboratively modified version of the asset. For example, the state data may describe at least one of positional information and dimensional information of the collaboratively modified version of the asset within the cooperative VR environment 106. In some embodiments, receiving the finished collaborative manipulation of the asset corresponds to the computing device receiving both (i) a data transmission from the additional computing device 114 that the additional computing device 114 has received a first user input from additional VR controller(s) 122 corresponding to a completion of the collaborative manipulation, and (ii) a second user input from VR controllers 110 corresponding to a completion of the collaborative manipulation.

In response to the server device(s) 112 receiving the state data from the computing device, the state data may cause the VR network provider 128 to update the master VR state files 130 so that they reflect that a current state of the asset within the cooperative VR environment 106 corresponds to the collaboratively modified version of the asset. The VR network provider 128 then causes the server device(s) 112 to transmit update data to each of the additional computing device(s) 114 so that each of the computing devices is able to render an updated version of the cooperative VR environment 106 that includes the collaboratively manipulated version of the asset. In this way, each additional user 118 is provided with a rendered cooperative VR environment 106 that includes an asset that reflects the collaborative manipulations performed on the asset by the computing device 102 and the additional computing device 114. In some embodiments, the state data further may cause the VR network provider 128 to modify the permission status of the asset to reflect that the computing device 102 no longer has permission to collaboratively manipulate the asset.

Alternatively, if the server device 122 assigns permission to collaboratively manipulate the asset to the additional computing device 114, the computing device 102 transmits data indicating user inputs received by the VR controllers 110 to the additional computing device 114. For example, the computing device 102 may transmit the data indicating the user inputs received by the VR controllers 110 to the additional computing device 114 as location data 134. The additional computing device 114 may then use the data indicating the user inputs in combination with the user inputs received from the additional VR controller(s) 122 to generate a collaborative manipulation of the asset. The computing device 102 also may receive, from the additional computing device 114, data indicating user inputs received by the additional computing device 114 received via the additional VR controller(s) 122. The computing device 102 may then dynamically render a dynamic visual representation within the cooperative VR environment 106 that corresponds to the collaborative manipulations collectively performed on the asset by the computing device 102 and the additional computing device 114. In some embodiments, the computing device 102 receives the data indicating the user inputs received by the additional computing device 114 via the location data 134 received from the additional computing device 114.

Once the additional computing device 114 receives user inputs from the VR controllers 110 and the additional VR controller(s) 122 that correspond to a finished collaborative manipulation of the asset, the VR program 124 causes the additional computing device 114 to transmit state data that indicates that the asset has been collaboratively manipulated to become a collaboratively modified version of the asset. In response to the server device(s) 112 receiving the state data from the additional computing device 114, the state data may cause the VR network provider 128 to update the master VR state files 130 so that they reflect that a current state of the asset within the cooperative VR environment 106 corresponds to the collaboratively modified version of the asset. The VR network provider 128 then causes the server device(s) 112 to transmit update data to each of the additional computing device(s) 114 and the computing device 102 so that each of the computing devices 102 and additional computing devices 114 is able to render an updated version of the cooperative VR environment 106 that includes the collaboratively manipulated version of the asset.

In some embodiments, the VR network provider 128 allows computing device 102 to add user controlled assets within the cooperative VR environment 106 which are not stored locally on the computing device 102, but are instead stored remotely on network accessible resources. This allows the system disclosed herein to provide the ability to allow users 104 and additional users 118 to add assets from a vast library of assets to the cooperative VR environment 106 without requiring large data transmissions or large data footprints on the local memory of the computing device 102. The process of adding a user controlled asset within the cooperative VR environment 106 may be initiated based on the computing device 102 receiving a user input from the VR controllers 110 that corresponds to a selection to add the user controlled asset.

In some embodiments, the selection may comprise a gesture interaction with a graphical user interface that presents a visual representation of the user controlled asset, and which is rendered by the computing device 102 within the cooperative VR environment 106. For example, the user 104 may select to add a particular user controlled asset to the cooperative VR environment 106 by grasping or otherwise selecting a visual representation of the particular user controlled asset and moving the visual representation from the graphical user interface and into the cooperative VR environment 106. Alternatively, the user 104 may select to add a particular user controlled asset to the cooperative VR environment 106 by virtually interacting with an interactive component of the graphical user interface, such as a button, switch, slider, or other interactive element.

The computing device 102 then transmits a data request to the server device(s) 112 requesting VR files 126 for the selected user controlled asset. Upon receiving the request, the VR network provider 128 causes the server device(s) 112 to identify the VR files 126 that correspond to the selected user controlled asset within the asset database. In some embodiments, this may involve the server device(s) 112 accessing a user specific asset database that is associated with the user 104. Where the asset database is user specific, the server device(s) 112 may determine whether the user 104 associated with the request has permissions to add the selected user controlled asset to the cooperative VR environment 106. The server device(s) 112 then transmit VR files 126 for rendering the selected user controlled asset to the computing device 102. For example, based on the computing device 102 requesting data for a particular object, the server device(s) 112 may transmit model data for rendering the particular object. The model data may correspond to data that indicates the geometric properties of the object, characteristics of the object, how the object interacts with the cooperative VR environment 106 or other objects within the cooperative VR environment 106, how the object can be manipulated, etc.

The computing device 102 then utilizes the VR files 126 for the selected user controlled asset to render a digital representation of the selected user controlled asset within the cooperative VR environment 106. Additionally, the computing device also may utilize the VR files 126 for the selected user controlled asset to manipulate the selected user controlled asset within the cooperative VR environment 106. In response to the computing device 102 receiving a user input from the VR controllers 110 corresponding to an addition and/or manipulation of the selected user controlled asset within the cooperative VR environment 106, the VR program 124 causes the computing device 102 to transmit state data that indicates that the particular user controlled asset was added to the cooperative VR environment 106, and/or indicates the characteristics (e.g., size, orientation, position, geometry, color, texture, etc.) of the particular user controlled asset as manipulated by the computing device 102. For example, the state data may describe at least one of the digital location and orientation of the particular user controlled asset within the cooperative VR environment 106.

When received by the server device(s) 112, the state data may cause the VR network provider 128 to update the master VR state files 130 so that they reflect that the cooperative VR environment 106 includes the particular user controlled asset. The VR network provider 128 then causes the server device(s) 112 to transmit update data to each of the additional computing device(s) 114 so that each of the computing devices are able to then render an updated version of the cooperative VR environment 106 that includes the particular user controlled asset. In some embodiments, transmitting the update data may include transmitting the VR files 126 associated with the particular user controlled asset so that the additional computing device(s) 114 are able to render and/or manipulate the particular user controlled asset within the cooperative VR environment 106. This enables such additional computing device(s) 114 to manipulate the particular user controlled asset and/or otherwise collaborate on group tasks that involve the particular user controlled asset within the cooperative VR environment 106. Not only does this allow for a more efficient transfer of VR files 126 between the computing device 102, server device(s) 112, and additional computing device(s) 114, but it also enables the additional computing device(s) 114 to selectively access VR files 126 and/or participate in collaborative VR projects associated with the particular user controlled assets that the corresponding additional users 118 may not otherwise have access to and/or be able to participate in.

FIG. 2-3 are schematic diagrams illustrating example server devices 200 and computing devices 300 for generating, maintaining, and operating a cooperative VR environment across multiple computing devices, according to the present disclosure. FIG. 1 illustrates a generalized system and conceptual flow of operations. FIGS. 2-3 illustrate additional details of hardware and software components that may be utilized to implement such techniques. The systems 200-300 are merely two examples, and the techniques described herein are not limited to performance using the systems 200-300 of FIGS. 2-3. Accordingly, any of the details of server device(s) 112 and/or computing device 300 described or depicted with regard to FIGS. 2-3 may be utilized within environment 100 of FIG. 1. Additionally, any of the details described or depicted with regard to computing device 102, server device(s) 112, and/or additional computing device 114 within environment 100 of FIG. 1 may be utilized by one or more of server device 112 and computing device 300 of FIG. 3.

FIG. 2 is a schematic diagram illustrating an example server device(s) 200 for generating, maintaining, and operating a cooperative VR environment across multiple computing devices, according to the present disclosure. FIG. 2 illustrates additional details of the hardware and software components that may be utilized with environment 100 of FIG. 1, that may be utilized to communicate with systems 300 of FIG. 3, and/or that may be utilized to implement techniques and/or methods 400-700 illustrated in FIGS. 4-7. The system 200 is merely an example, and the techniques described herein are not limited to performance using the system 200 of FIG. 2.

According to the present disclosure, server device 112 may correspond to any computing device that is connected to computing device 102, additional computing device(s) 114, and/or computing device 300 over a network 116. In various embodiments, the server device(s) 112 may correspond to a personal computer, a laptop computer, a tablet computer, a smart appliance, an internet-of-things appliance, a smartphone, one or more server(s), or other type of electronic device. For example, the server device(s) 112 may include a collection of server devices that provide network services for generating, maintaining, and operating a cooperative VR environment 106 across one or more of computing device 102, additional computing device(s) 114, and/or computing device 300, and/or provide cloud storage service for storing and distributing VR files 126, master VR state files 130, between the computing device 102, additional computing device(s) 114, and/or computing device 300.

In FIG. 2, the server device(s) 112 include one or more processors 202, memory 204 communicatively coupled to the one or more processors 202, and a network interface 206. According to the present disclosure, the memory 204 stores a VR network provider 128 that includes a permissions management module 208, a manipulations module 210, and an update distribution module 212. The memory 204 further stores a permission schedule 214, master VR state files 130, and an asset database 132, which in turn stores master versions of the VR files 126.

The permission schedule 214 may correspond to a data file, table, database, or other data structure that identifies the permissions status of individual assets within the cooperative VR environment 106. The master VR state files 130 may be data assemblies indicating the state of the cooperative VR environment 106. For example, a master VR state file 130 may identify the assets that are included within the cooperative VR environment 106, the characteristics of these assets model data, 3D mesh data, asset data, state data, VR format files, or one or other data assemblies indicating dimensions, positions, orientations, textures, materials, groupings, or other information for rendering and/or interacting with the cooperative VR environment 106 or component elements thereof. In some embodiments, the master VR state files 130 further may include links to VR files 126 within the asset database 132 that are associated with assets within the cooperative VR environment 106.

The asset database 132 corresponds to a stored collection of master versions of the VR files 126 for rendering and/or manipulating one or more assets. For example, the asset database 132 may be a data library that includes data files describing texture patterns, 3D models for rendering assets in VR, characteristics of the assets (e.g., how an asset can be manipulated, how the asset interacts with other assets, how the asset interacts with the cooperative VR environment 106, etc.), groupings of assets, or a combination thereof. In some embodiments, the asset database 132 stores the master version of all VR files 126 for the cooperative VR environment 106 and/or the assets therein. In some embodiments, the asset database 132 may include links that indicate particular cooperative VR environments 106 that individual assets are included within. Additionally, in some embodiments the asset database 132 may include one or more sub databases or libraries that are associated with one or more user accounts associated with the user 104, one or more additional users 118, or a combination thereof. In such embodiments, permission to access the data stored in the sub databases or libraries may be limited to a particular subset of user accounts or computing devices.

The VR network provider 128 is executable on the one or more processors 202 to cause the server device(s) 112 to manage permissions, data transfers, updates, and distribution of asset data between the computing device 102 and the additional computing device(s) 114 so as to allow each of the computing device 102 and the additional computing device(s) 114 to render a cooperative VR environment 106 that allows collaboration between multiple users while also providing a smooth VR experience, such as is discussed herein with reference to FIGS. 1 and 4-7.

The permissions management module 208 is executable on the one or more processors 202 to cause the server device(s) 112 to validate requests from a computing device (e.g., computing device 102, additional computing device(s) 114, and/or computing device 300). This may include validating the identity of the computing device, determining the permission rights of the computing device with regard to one or more of the VR state files 130 and VR files 126, and/or determining the permission rights to assets within the cooperative VR environment 106 to be modified. For example, the permissions management module 208 may validate a computing device 102 and/or a user account associated with the user 104 using an identifier (e.g., username, password, account identifier, device identification code, etc.) that is included within a communication (e.g., message, request, etc.) received from the computing device 102.

In some embodiments, the permissions management module 208 also is executable on the one or more processors 202 to cause the server device(s) 112 to determine whether a user account and/or computing device associated with a request has permission to receive a VR state file 130 and VR files 126. For example, the permissions management module 208 may determine whether the requesting user account and/or computing device has permission to access VR state files 130, VR files 126, or both. In some embodiments, the permissions management module 208 determines whether a requesting user account and/or computing device has permission to access a requested file based on the permission schedule 214. For example, in response to the server device(s) 112 receiving a request for one or more VR state files 130 associated with a cooperative VR environment 106, the permissions management module 208 may access the permission schedule 214 to see if the permission schedule 214 identifies the requesting user account and/or computing device as having rights to access the requested VR state files 130. Where the permissions management module 208 determines that the requesting user account and/or computing device has rights to access the requested VR state files 130 and/or VR files 126, the permissions management module 208 then causes the server device(s) 112 to transmit the requested VR state files 130 and/or VR files 126 to the requesting computing device over network 116. In some embodiments, this may include transmitting a version of the requested VR state files 130 and/or VR files 126 that is optimized to be executed on a type of the requesting computing device and/or an operating system associated with the requesting computing device.

Alternatively, or in addition, the permissions management module 208 also may be executable on the one or more processors 202 to cause the server device(s) 112 to determine whether an asset within the cooperative VR environment 106 is available to be modified by a computing device. For example, the permissions management module 208 may determine a current permission status of an asset within the cooperative VR environment 106 which a computing device is requesting to manipulate. The permission status of an asset may include, but is not limited to, any one of: available for manipulation, available for manipulation of a particular type, locked for manipulation (i.e., currently being manipulated by a computing device and not available for manipulation by another user), locked for manipulation of a particular type (and not available for manipulation of the same type by another user), etc. In some embodiments, the permissions management module 208 determines whether an asset within the cooperative VR environment 106 is available to be modified based on the permission schedule 214.

For example, in response to the server device 112 receiving a request to manipulate an asset within the cooperative VR environment 106, and the permission schedule 214 indicates that the permission status of the asset requested to be modified is locked for manipulation and/or locked for the type of manipulation that the requesting computing device is requesting to perform, the permissions management module 208 causes the server device(s) 112 to reject the request to manipulate the asset. In some embodiments, rejecting the request to manipulate the asset may include causing the server device 112 to transmit a data signal to the requesting computing device over network 116 that indicates that the asset is locked for manipulation, or is otherwise unavailable to be modified by the requesting computing device.

Alternatively, in response to the server device 112 receiving a request to manipulate an asset within the cooperative VR environment 106, and the permission schedule 214 indicates that the permission status of the asset requested to be modified is available for manipulation and/or available for the type of manipulation that the requesting computing device is requesting to perform, the permissions management module 208 causes the server device(s) 112 to transmit a data signal over network 116 that causes the requesting computing device to be able to manipulate the asset. In some embodiments, the data signal may include a notification that the computing device has been assigned permission to manipulate the asset, and/or one or more of VR files 126 and/or VR state files 130 that enable the requesting computing device to manipulate the requested asset. In some embodiments, the server device(s) 112 also may compress and/or encrypt the VR files 126 and/or VR state files 130 before transferring the VR files 126 and/or VR state files 130 to the requesting computing device over network 116. The permissions management module 208 also may change the permission status of the asset within the permission schedule 214 to indicate that the asset is locked for manipulation by the requesting computing device.

In some embodiments, the permissions management module 208 also is executable on the one or more processors 202 to cause the server device(s) 112 to facilitate collaborative manipulation of an asset within the cooperative VR environment 106 by multiple computing devices. For example, in response to the server device(s) 112 receiving a request from one computing device to collaboratively manipulate an asset within the cooperative VR environment 106 with another computing device, or receiving multiple requests from different computing devices to collaboratively manipulate an asset within the cooperative VR environment 106 together, the permissions management module 208 may: (1) determine that each of the requesting computing devices has permission to receive a VR state files 130 and VR files 126 needed to perform the requested collaborative manipulation, (2) determine that the asset requested to be collaboratively manipulated is available to be modified by the requesting computing devices, and (3) assign permission to collaboratively manipulate the asset to a single computing device of the requesting computing devices.

Assigning permission to collaboratively manipulate the asset may include transmitting a data signal that may include a notification that the single computing device has been assigned permission to collaboratively manipulate the asset, and/or one or more of VR files 126 and/or VR state files 130 that enable the single computing device to collaboratively manipulate the requested asset. The permissions management module 208 also may change the permission status of the asset within the permission schedule 214 to indicate that the asset is locked for manipulation by the single computing device.

The manipulations module 210 is executable on the one or more processors 202 to cause the server device(s) 112 to modify one or more of the master versions of the VR files 126 and/or VR state files 130 stored on the memory 204. In some embodiments, in response to the server device(s) 112 receiving a data signal from a computing device (e.g., computing device 102, additional computing device(s) 114, and/or computing device 300) that indicates that the computing device has performed a modification, the manipulations module 210 causes the server device(s) 112 to modify one or more of the master versions of the master VR state files 130 stored on the memory 204 to reflect that the asset has been modified. For example, the data signal may indicate that the computing device has completed a manipulation of an asset within the cooperative VR environment 106 such that the asset within the cooperative VR environment 106 has become a modified version of the asset. The data signal may include data that describes the manipulation of the asset, such as a type of modification(s) performed (e.g., color change, texture change, translation, reorientation, resizing, distortion, etc.) and the result of the modification(s) performed (e.g., positional information indicating the VR location of the modified version of the asset within the cooperative VR environment 106, a texture of the modified version of the asset, etc.) In response to receiving such a data signal, the manipulations module 210 causes the server device(s) 112 to modify one or more of the master versions of the master VR state files 130 stored on the memory 204 so that they indicate that the asset within the cooperative VR environment 106 is the modified version of the asset.

In some embodiments, the manipulations module 210 also is executable on the one or more processors 202 to cause the server device(s) 112 to allow master versions of the VR files 126 stored in the asset database 132 to be modified. For example, in response to data indicating a modification of the master versions of the VR files 126 stored in the asset database 132, the manipulations module 210 may cause the server device(s) 112 to modify one or more of the master versions of the VR files 126 within the asset database 132 stored on the memory 204 so that the master versions of the VR files 126 indicated that corresponding asset is a modified version of the asset. Where the asset database 132 also includes links that indicate particular cooperative VR environments 106 that individual assets are included within, an edit of a master version of a VR file 126 also may cause the server device(s) 112 to transmit update data over network 116 to each computing device 102 and additional computing device(s) 114 associated with a cooperative VR environment 106 that includes the modified asset. The update data may cause these computing devices to render their respective cooperative VR environments 106 as including the modified version of the asset. Where the modification of the VR files 126 corresponds to a removal of the master versions of the VR files 126 associated with a particular asset from the asset database 132, the server device(s) 112 may transmit update data over network 116 that causes the computing devices to render their respective cooperative VR environments 106 as not including the particular asset.

The update distribution module 212 is executable on the one or more processors 202 to cause the server device(s) 112 to transmit update data over network 116 to each of the computing devices associated with the cooperative VR environment 106 (e.g., computing device 102, additional computing device(s) 114, and/or computing device 300). In some embodiments, the update distribution module 212 may cause the server device(s) 112 to transmit the update data in response to an asset in the cooperative VR environment 106 being manipulated to become a modified version of the asset, and/or the master versions of the VR files 126 and/or VR state files 130 stored on the memory 204 being modified so that the VR files 126 and/or VR state files 130 stored on the memory 204 indicate that corresponding asset is a modified version of the asset. The update distribution module 212 may cause the server device(s) 112 to transmit update data to the computing devices over the network 116 that causes the computing devices to render an updated version of the cooperative VR environment 106, where the asset within the updated version of the cooperative VR environment 106 is the modified version of the asset. The update data may include one or more updated versions of the master versions of the VR files 126 and/or VR state files 130 that allow the computing devices to render and/or manipulate the modified version of the asset. Additionally, where the manipulation of an asset corresponds to the translation of a dynamic avatar 136 within the cooperative VR environment 106, the update distribution module 212 may cause the server device(s) 112 to transmit update data that causes the computing device associated with a user account that the dynamic avatar 136 represents to re-render the cooperative VR environment 106 such that the perspective of the cooperative VR environment 106 presented on the corresponding additional VR display 120 is modified in correspondence with the translation of dynamic avatar 136.

FIG. 3 is a schematic diagram illustrating an example computing device(s) 300 for generating, maintaining, and operating a cooperative VR environment across multiple computing devices, according to the present disclosure. FIG. 3 illustrates additional details of hardware and software components that may be utilized with environment 100 of FIG. 1, that may be utilized to communicate with server device(s) 112 of FIG. 2, and/or that may be utilized to implement techniques and/or methods 400-700 illustrated in FIGS. 4-7. The computing device 300 is merely an example, and the techniques described herein are not limited to performance using the computing device 300 of FIG. 3.

According to the present disclosure, computing device 300 may correspond to any computing device that is connected to computing device 102, additional computing device(s) 114, and/or server device(s) 112 over a network 116. In various embodiments, the computing device 300 may correspond to a personal computer, a laptop computer, a tablet computer, a VR computing system, a PDA, a smartphone, a wearable computing device, a game console, a set-top box, a smart television, a portable game player, a portable media player, or other type of electronic device. For example, the computing device 300 may be configured to determine interactions between a user 104 associated with the computing device and the cooperative VR environment 106, transmit updates and requests with the computing device 102, additional computing device(s) 114, and/or server device(s) 112 over a network 116, and render the cooperative VR environment 106 on an associated VR display 120.

In FIG. 3, the computing device 300 includes one or more processors 302, memory 304 communicatively coupled to the one or more processors 302, and a network interface 306. According to the present disclosure, the memory 304 stores a VR program 124 that includes an interaction module 308, a communications module 310, and rendering module 312. The memory 304 further stores VR files 126. FIG. 3 further illustrates computing device 300 as optionally including a VR display 108 and/or one or more VR controllers 110 as component portions of the computing device 300. Alternatively, one or more of the VR display 108 and/or one or more VR controllers 110 may be separate components from the computing device 300 that are connected to the computing device over a wired or wireless connection.

According to the present disclosure, the VR files 126 may include model data, 3D mesh data, asset data, state data, VR format files, or one or other data assemblies indicating information for enabling the computing device 300 to render and/or interact with the cooperative VR environment 106 or component elements thereof (e.g., objects, structures, textures, materials, groups, etc.). The VR files 126 may include a file that corresponds to a stored collection of coded instructions for rendering the cooperative VR environment 106 and/or the assets within the cooperative VR environment 106. For example, an individual VR file 126 may describe the dimensions, positions, orientations, textures, materials, groupings, or other characteristics of individual component elements of the cooperative VR environment 106. Alternatively, or in addition, the VR files 126 may include an asset file that corresponds to a stored collection of coded instructions that enable computing device 300 to render an associated asset within the cooperative VR environment 106.

The VR program 124 is executable on the one or more processors 302 to cause the computing device 300 to provide a cooperative VR environment 106 to the user that allows collaboration between multiple users while also providing a smooth VR experience, such as is discussed herein with reference to FIGS. 1 and 4-7. The interaction module 308 is executable on the one or more processors 302 to cause the computing device 300 to determine that one or more inputs from the VR controllers 110 correspond to an interaction with the cooperative VR environment 106. In some embodiments, the inputs from the VR controllers 110 may correspond to a translation of a VR controller 110, a rotation of a VR controller 110, an actuation of an interactive component of a VR controller 110 (e.g., a key, button, trigger, roller, touchpad, switch, slider, joystick, etc.), a voice command, or a combination thereof.

Upon receiving an input from the VR controllers 110, the interaction module 308 causes the computing device 300 to determine a VR interaction based on the context of the input in relation to the cooperative VR environment 106. A VR interaction may correspond to a selection of a VR tool (e.g., shape adjustment tool, menu tool, translational tool, asset creation tool, a camera tool, a painting tool, a grouping tool, a navigation tool, a movement tool, a copying tool etc.), a command, a request to select an asset or group of assets within the cooperative VR environment 106, a request to add an asset or group of assets within the cooperative VR environment 106, a request to manipulate an asset or group of assets within the cooperative VR environment 106, a request to move to a new virtual location within the cooperative VR environment 106, a request to apply a texture or color to an existing asset within the cooperative VR environment 106, a request to create multiple instances of an existing asset within the cooperative VR environment 106, a request to create and/or position a virtual camera within the cooperative VR environment 106, etc. The context of the input may include one or more of the virtual locations of a user associated with computing device 300, a perspective of the cooperative VR environment 106 rendered by the computing device 300, VR state files 130, VR files 126, user settings associated with the user account, etc. In some embodiments, the selection of a VR tool may be visualized as the selection and attachment of a tool head to a tool body held in the virtual hand of an avatar within the cooperative VR environment 106.

The communication module 310 is executable on the one or more processors 302 to cause the computing device 300 to transmit updates and requests with the computing device 102, additional computing device(s) 114, and/or server device(s) 112 over a network 116. For example, where the computing device 300 receives an input from the VR controllers 110 that corresponds to a selection and/or manipulation of an asset within the cooperative VR environment 106, the communication module 310 causes the computing device 300 to transmit to the server device(s) 112 a request for permission to manipulate the asset. The request to manipulate the asset may be a data transmission (e.g., message, request, etc.) that indicates one or more of an identification of the asset, an identification of a type of manipulation requested to be performed, an identifier associated with the computing device 300 or an associated user account (e.g., username, password, account identifier, device identification code, etc.).

In some embodiments, where the input corresponds to a request to collaboratively manipulate the asset within the cooperative VR environment 106 with another computing device, the communications module 310 causes the computing device 300 to transmit to the server device(s) 112 a request for permission to collaboratively manipulate the asset. The request to collaboratively manipulate the asset may indicate one or more of an identification of the asset, an identification of a type of manipulation requested to be performed, an identifier associated with one or both of the computing device 300 and the other computing devices or an associated user account. Alternatively, the communication module 310 may cause the computing device 300 to transmit to the other computing device and over the network 116 a request that the other device transmit a request to the server device 112 a request for permission to collaboratively manipulate the asset.

Additionally, where the computing device 300 receives an input from the VR controllers 110 that corresponds to a request to add an asset to the cooperative VR environment 106, the communications module 310 causes the computing device 300 to transmit to the server device(s) 112 a request for VR files 126 to render the asset within the cooperative VR environment 106. For example, based on the computing device 300 requesting to add a particular asset, the server device(s) 112 may transmit model data for rendering the particular object. The model data may correspond to data that indicates the geometric properties of the object, characteristics of the object, how the object interacts with the cooperative VR environment 106 or other objects within the cooperative VR environment 106, how the object can be manipulated, etc. Alternatively, where the VR files 126 for rendering the asset are already stored on the memory 304 of the computing device 300 (e.g., on a memory cache), in response to receiving an input that corresponds to a request to add an asset, the computing device 300 may render the asset within the cooperative VR environment 106 based on the VR files 126 stored on the memory 304 of the computing device 300.

Where the input corresponds to a manipulation of the cooperative VR environment 106, and/or one or more assets within the cooperative VR environment 106, the communication module 310 causes the computing device 300 to transmit to a data signal to the server device(s) 112 that indicates that the cooperative VR environment 106, and/or one or more assets therein has been manipulated to become a modified version of the environment/asset. For example, the data signal may indicate that the computing device 300 has completed a manipulation of an asset within the cooperative VR environment 106 such that the asset within the cooperative VR environment 106 has become a modified version of the asset. The data signal may include data that describes the manipulation of the asset, such as a type of modification(s) performed (e.g., color change, texture change, translation, reorientation, resizing, distortion, etc.) and the result of the modifications performed (e.g., positional information indicating the VR location of the modified version of the asset within the cooperative VR environment 106, a texture of the modified version of the asset, etc.), a link to a location where one or more master versions of VR files 126 are stored in an asset database 132, etc. In some embodiments, the communication module 310 may cause the computing device 300 to generate some or all of the data in the data signal based on the user input, the VR files 126, VR state file 130, or a combination thereof.

In some embodiments, the communication module 310 causes the computing device 300 to transmit location data 134 over the network 116 to one or more of the computing device 102, additional computing device(s) 114, and/or server device(s) 112. The location data 134 indicates positional information relating to the virtual location of the user 104 associated with the computing device 300 and/or the VR controllers 110 within the cooperative VR environment 106. In some embodiments, the location data may be transmitted over a less reliable data stream, such as a UDP.

The rendering module 312 is executable on the one or more processors 302 to cause the computing device 300 to render the cooperative VR environment 106 on the VR display 108. More specifically, the rendering module 312 is executable to cause the computing device 300 to render the cooperative VR environment 106 on the VR display 108 such that an associated user is provided with an immersive experience within the cooperative VR environment 106. For example, based on the VR files 126, the computing device 300 may render the VR environment 106 as including assets such as structures, objects, textures, and groupings thereof. The computing device 300 renders the cooperative VR environment 106 on the VR display 108 using location information describing a virtual position of the user associated with the computing device 300 within the cooperative VR environment 106. In this way, the computing device 102 is able to render the cooperative VR environment 106 on the VR display 108 such that the user is presented with a perspective within the cooperative VR environment 106 consistent with the user's virtual position within the cooperative VR environment 106.

The rendering module 312 also may cause the computing device 300 to render one or more portions of the cooperative VR environment 106 and/or the assets therein based on user inputs received from the VR controllers 110. For example, the rendering module 312 may cause the computing device 300 to render within the cooperative VR environment 106 dynamic virtual representations of one or more of the VR controllers 110, VR tools used by the user, a dynamic avatar 136 representing the user 104, previews of manipulations of assets and/or previews of assets that a user 104 is adding to the cooperative VR environment 106.

In response to the computing device 300 receiving update data from the server device(s) 112 that identifies alterations and/or manipulations of the cooperative VR environment 106 and/or assets within the cooperative VR environment 106, the rendering module 312 also may cause the computing device 300 to render an updated version of the cooperative VR environment 106 that includes the alterations and/or manipulations. For example, where the update data indicates that an asset has been added to the cooperative VR environment 106 and/or manipulated within the cooperative VR environment 106 so as to become a modified version of the asset, the rendering module 312 also may cause the computing device 300 to render an updated version of the cooperative VR environment 106 that includes added assets and/or the modified version of the asset. In another example, where the update data indicates that the master versions of the VR files 126 stored in the asset database 132 have been modified so that an associated asset is a modified version of the asset, the rendering module 312 also may cause the computing device 300 to render an updated version of the cooperative VR environment 106 that includes the modified version of the asset. Additionally, where the update data indicates that the master versions of the VR files 126 stored in the asset database 132 have been modified so that the data associated with a particular asset is removed, the rendering module 312 also may cause the computing device 300 to render an updated version of the cooperative VR environment 106 that does not include the particular asset.

The update data may include state data that indicates the digital location of the asset within the cooperative VR environment 106, the size of the asset, the orientation of the asset, position, color of the asset, texture of the asset, etc. Where an asset was added to the cooperative VR environment 106, the update data may include one or more VR files 126 that enable the computing device 300 to render the computing device within the cooperative VR environment 106. For example, the update data may indicate that a particular asset was modified so that it has a new surface coloring, and may include a VR file 126 that allows the computing device 300 to render the new surface coloring on the asset. In some embodiments, the VR files 126 and/or VR state data 130 and updates relating to the state of the cooperative VR environment 106 and/or the assets within may be transmitted over a highly reliable data stream, such as a TCP.

Where the manipulation indicated by the update data corresponds to a translation of a dynamic avatar 136 representing a user account associated with the computing device 300 (or a translation of a group of assets including such a dynamic avatar 136), the update data may include data configured to cause the computing device 300 to render the cooperative VR environment 106 such that the perspective of the cooperative VR environment 106 presented on the corresponding additional VR display 120 is modified in correspondence with the translation of the group of assets by the computing device 102.

In some embodiments, the rendering module 312 is further configured to utilize the location data 134 received from another computing device (e.g., computing device 102, additional computing device(s) 114, etc.) to cause the computing device 300 to render a dynamic avatar 136 that represents a virtual representation of a user 104 associated with the other computing device within the cooperative VR environment 106. The location and characteristics of the dynamic avatar 136 may be re-rendered as new location data 134 is received from the other computing device. In some embodiments, the location data 134 further may identify a VR tool (e.g., shape adjustment tool, menu tool, translational tool, asset creation tool, etc.) that the corresponding additional user 118 is currently using, a task that the additional user 118 is currently performing, an asset that the additional user 118 is currently manipulating, etc. In such embodiments, the rendering module 312 may cause the computing device 300 to render dynamic virtual representations of VR controllers associated with the other computing device, VR tools used by the other computing device, previews of manipulations of assets by the other computing device, and/or previews of assets that the other computing device is adding to the cooperative VR environment 106.

The VR display 108 may include a computer display, a dedicated VR headset, a head mounted display, a smartphone display, or other devices configured to provide a user 104 with an experience within the cooperative VR environment 106. For example, the computing device 300 may cause the cooperative VR environment 106 to be rendered on a screen of a VR headset so as to provide a user 104 wearing the VR headset with an immersive experience within the cooperative VR environment 106. The VR controllers 110 may include a keyboard, joystick, game controller, rudder, treadmill, touchpad, computer mouse, wearable device, or other devices configured to provide user inputs and or interactions that correspond to manipulations within the cooperative VR environment 106.

According to the present disclosure, the one or more processor(s) 202 and 302 depicted in FIGS. 2-3 may be configured to execute instructions, applications, or programs stored in memories 204 and 304. In some examples, the one or more processor(s) 202 and 302 include hardware processors that include, without limitation, a hardware central processing unit (CPU), a graphics processing unit (GPU), a field-programmable gate array (FPGA), a complex programmable logic device (CPLD), an application-specific integrated circuit (ASIC), a system-on-chip (SoC), or a combination thereof.

The memories 204 and 304 depicted in FIGS. 2-3 are examples of computer-readable media. Computer-readable media may include two types of computer-readable media, namely computer storage media and communication media. Computer storage media may include volatile and non-volatile, removable and non-removable media implemented in any method or technology for storage of information, such as computer-readable instructions, data structures, program modules, or other data. Computer storage media includes, but is not limited to, random access memory (RAM), read-only memory (ROM), erasable programmable read-only memory (EPROM), electrically erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device, such as computing device 102, server device(s) 112, additional computing device(s) 114, and/or computing device 300. In general, computer storage media may include computer-executable instructions that, when executed by one or more processors, cause various functions and/or operations described herein to be performed.

In contrast, communication media embody computer-readable instructions, data structures, program modules, or other data in a modulated data signal, such as a carrier wave, or other transmission mechanism. As defined herein, computer storage media does not include communication media.

Additionally, the network interfaces 206 and 306 include physical and/or logical interfaces for connecting the respective computing device(s) to another computing device or a network. For example, the network interfaces 206 and 306 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

FIGS. 4-7 schematically provide flowcharts that represent examples of methods according to the present disclosure. In FIGS. 4-7, some steps are illustrated in dashed boxes indicating that such steps may be optional or may correspond to an optional version of a method according to the present disclosure. That said, not all methods according to the present disclosure are required to include the steps illustrated in dashed boxes. Additionally, the order of steps illustrated in FIGS. 4-7 is exemplary, and in different embodiments, the steps in FIGS. 4-7 may be performed in a different order. The methods and steps illustrated in FIGS.

4-7 are not limiting, and other methods and steps are within the scope of the present disclosure, including methods having greater than or fewer than the number of steps illustrated, as understood from the discussions herein.

Figure 4:
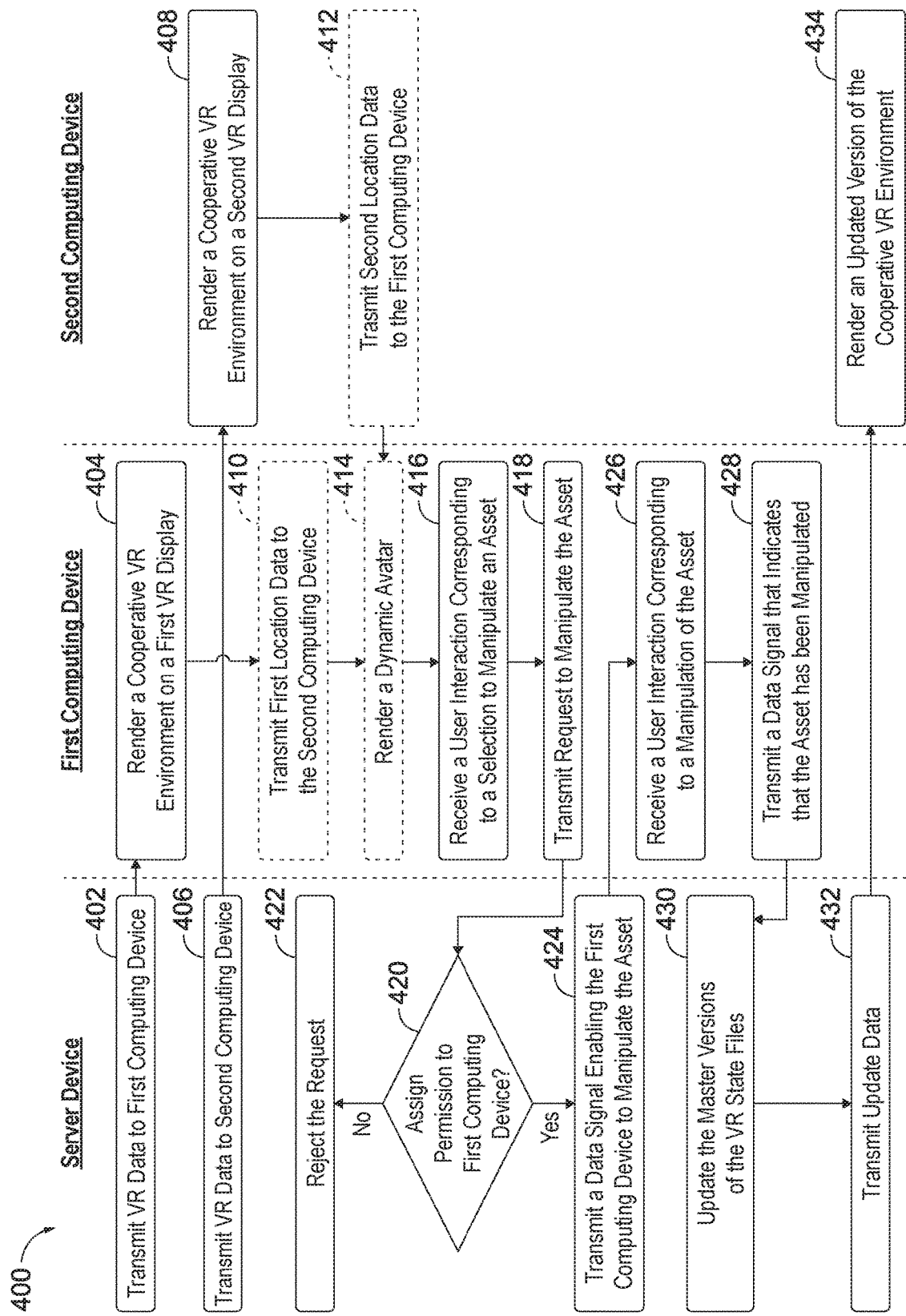
FIG. 4 is a flowchart depicting methods for manipulating assets within a cooperative VR environment executing across multiple computing devices.

FIG. 4 is a flowchart depicting methods 400, according to the present disclosure, for manipulating assets within a cooperative VR environment executing across multiple computing devices. As shown in FIG. 4, at operation 402, a server device transmits VR data to a first computing device. The VR data may include model data, 3D mesh data, asset data, state data, VR format files, or one or other data assemblies indicating information for enabling the first computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition, the VR data may include a stored collection of coded instructions that enable the first computing device to render an associated asset within the cooperative VR environment.

At operation 404, the first computing device renders a cooperative VR environment on a first VR display. Specifically, the first computing device renders the cooperative VR environment on the first VR display based on the VR data, such that an associated user is provided with an immersive experience within the cooperative VR environment. For example, the first computing device may render the VR environment as including assets such as structures, objects, textures, and groupings thereof. In some embodiments, the first computing device renders the cooperative VR environment on the first VR display such that the user is presented with a perspective within the cooperative VR environment consistent with the user's virtual position within the cooperative VR environment. Alternatively, or in addition, the first computing device may also render dynamic virtual representations of one or more of the first VR controllers, VR tools used by a first user associated with the first computing device user, a dynamic avatar representing the first user, previews of manipulations of assets and/or previews of assets that the first user is adding to the cooperative VR environment.

At operation 406, a server device transmits VR data to a second computing device. The VR data may include model data, 3D mesh data, asset data, state data, VR format files, or one or other data assemblies indicating information for enabling the second computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition, the VR data may include a stored collection of coded instructions that enable the second computing device to render an associated asset within the cooperative VR environment.

At operation 408, the second computing device renders a cooperative VR environment on a second VR display. Specifically, the second computing device renders the cooperative VR environment on the second VR display based on the VR data, such that an associated user is provided with an immersive experience within the cooperative VR environment. For example, the second computing device may render the VR environment as including assets such as structures, objects, textures, and groupings thereof. In some embodiments, the second computing device renders the cooperative VR environment on the second VR display such that the user is presented with a perspective within the cooperative VR environment consistent with the user's virtual position within the cooperative VR environment. Alternatively, or in addition, the second computing device may also render dynamic virtual representations of one or more of the second VR controllers, VR tools used by a second user associated with the second computing device user, a dynamic avatar representing the second user, previews of manipulations of assets and/or previews of assets that the second user is adding to the cooperative VR environment.

At operation 410, the first computing device optionally transmits first location data to the second computing device. The first location data indicates positional information relating to the virtual location of the first user associated with the first computing device and/or the first VR controllers within the cooperative VR environment.

At operation 412, the second computing device optionally transmits second location data to the first computing device. The second location data indicates positional information relating to the virtual location of the second user associated with the second computing device and/or the second VR controllers within the cooperative VR environment.

At operation 414, the first computing device optionally renders a dynamic avatar associated with the second computing device within the cooperative VR environment. For example, the first computing device may be configured to utilize the second location data received from the second computing device to render a dynamic avatar that represents a virtual representation of the second user within the cooperative VR environment. The location and characteristics of the dynamic avatar may be re-rendered as new second location data is received from the second computing device. In some embodiments, the second location data further may identify a VR tool (e.g., shape adjustment tool, menu tool, translational tool, asset creation tool, etc.) that the second user is currently using, a task that the user is currently performing, an asset that the second user is currently manipulating, etc. In such embodiments, the first computing device may render dynamic virtual representations of VR controllers associated with the second computing device, VR tools used by the second computing device, previews of manipulations of assets by the second computing device, and/or previews of assets that the second computing device is adding to the cooperative VR environment.

At operation 416, the first computing device receives a user interaction corresponding to a selection to manipulate an asset within the cooperative VR environment. The user interaction may correspond to one or more inputs from the first VR controllers. In some embodiments, the inputs from the first VR controllers may correspond to a translation of the first VR controller, a rotation of the first VR controller, an actuation of an interactive component of the first VR controller (e.g., a key, button, trigger, roller, touchpad, switch, slider, joystick, etc.), a voice command, or a combination thereof.

Upon receiving the input from the first VR controllers, the first computing device may determine that one or more VR interactions have occurred based on the context of the input in relation to the cooperative VR environment. Individual VR interactions may correspond to a selection of a VR tool (e.g., shape adjustment tool, menu tool, translational tool, asset creation tool, etc.), a command, a request to select an asset or group of assets within the cooperative VR environment, a request to add an asset or group of assets within the cooperative VR environment, a request to manipulate an asset or group of assets within the cooperative VR environment, a request to move to a new virtual location within the cooperative VR environment, a request to manipulate (e.g. move, scale, rotate) a second user's avatar, etc. The context of the input may include one or more of the virtual locations of the first user associated with the first computing device, a perspective of the cooperative VR environment rendered by the first computing device, VR data, user settings associated with a first user account, etc.

At operation 418, the first computing device transmits a request to manipulate an asset within the cooperative VR environment to the server device. The request to manipulate the asset may be a data transmission (e.g., message, request, etc.) that indicates one or more of an identification of the asset, an identification of a type of manipulation requested to be performed, an identifier associated with the first computing device or the associated first user account (e.g., username, password, account identifier, device identification code, etc.).

At operation 420, the server device determines whether to assign permission to manipulate the asset to the first computing device. In some embodiments, the server computing device determines whether to assign permission to manipulate the asset based on a current permission status of the asset. The permission status of an asset may include, but is not limited to, any one of: available for manipulation, available for manipulation of a particular type, locked for manipulation (i.e., currently being manipulated by a computing device and not available for manipulation by another user) for manipulation, locked for manipulation of a particular type (and not available for manipulation of the same type by another user), etc. In some embodiments, the server device determines the permission status of an asset within the cooperative VR environment based on a permission schedule stored in a memory accessible to the server device.

Where the server device determines that the permission status of the asset requested to be modified is locked for manipulation and/or locked for the type of manipulation that the first computing device is requesting to perform, the process continues at operation 422, and the server device rejects the request to manipulate the asset. In some embodiments, rejecting the request to manipulate the asset may include transmitting a data signal to the first computing device that indicates that the asset is locked for manipulation, or is otherwise unavailable to be modified by the first computing device. The process then continues at operation 416, where the first computing device receives another user interaction corresponding to a selection to manipulate an asset within the cooperative VR environment.

Alternatively, where the server device determines that the permission status of the asset requested to be modified is available for manipulation and/or available for the type of manipulation that the first computing device is requesting to perform, the process continues at operation 424 and the server device transmits a data signal that enables the first computing device to manipulate the asset. In some embodiments, the data signal may include a notification that the first computing device has been assigned permission to manipulate the asset, and/or VR data that enables the first computing device to manipulate the asset. In some embodiments, the server device also may compress and/or encrypt the VR data before transferring it to the first computing device.

At operation 426, the first computing device receives a user interaction corresponding to a manipulation of the asset to become a modified version of the asset. The user interaction may be received via one or more inputs from the first VR controllers that correspond to a manipulation of the asset within the cooperative VR environment such that the asset has become a modified version of the asset.

At operation 428, the first computing device transmits a data signal to the server device that indicates that the asset has been manipulated to become a modified version of the asset. The data signal may include data that describes the manipulation of the asset, such as a type of modification(s) performed (e.g., color change, texture change, translation, reorientation, resizing, distortion, etc.) and the result of the modifications performed (e.g., positional information indicating the VR location of the modified version of the asset within the cooperative VR environment, a texture of the modified version of the asset, etc.), a link to a location where one or more master versions of VR files are stored in an asset database, etc.

At operation 430, the server device updates the master versions of the VR state files based on the data signal. In some embodiments, in response to the server device receiving a data signal from the first computing device indicating that the first computing device has performed a modification of an asset, the server device modifies the master versions of the master VR state files stored on a memory accessible to the server device to reflect that the asset has been modified. For example, where the data signal indicates that the computing device has completed a manipulation of an asset within the cooperative VR environment such that the asset within the cooperative VR environment has become a modified version of the asset, the server device, may modify one or more of the master versions of the master VR state files so that they indicate that the asset within the cooperative VR environment is the modified version of the asset.

At operation 432, the server device transmits update data to the second computing device. Specifically, the server device transmits update data to the second computing device that causes the second computing device to render an updated version of the cooperative VR environment, where the asset within the updated version of the cooperative VR environment is the modified version of the asset. At operation 434, the second computing device renders an updated version of the cooperative VR environment in which the asset is the modified version of the asset.

Figure 5:
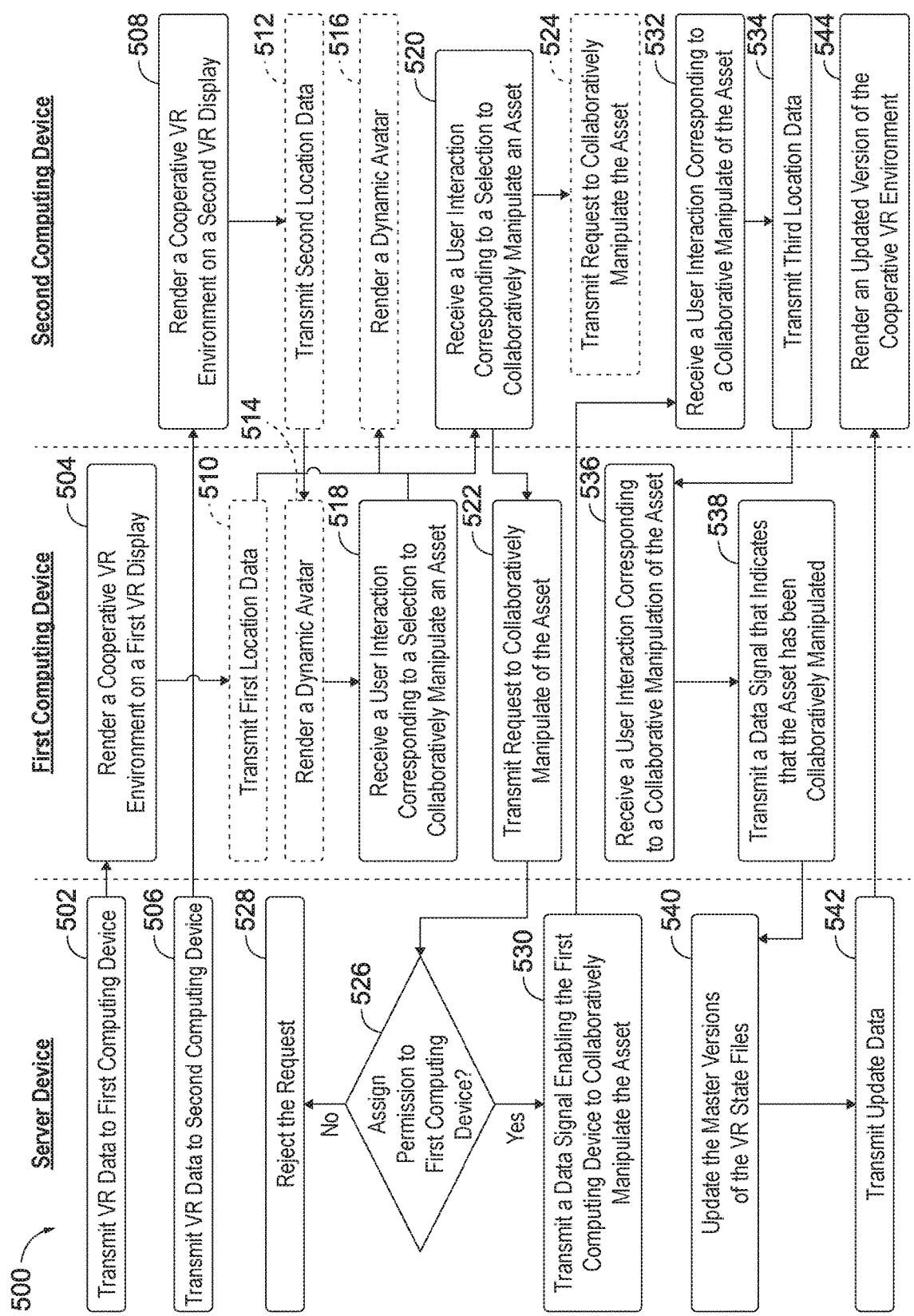
FIG. 5 is flowchart depicting methods for collaboratively manipulating assets within a cooperative VR environment executing across multiple computing devices.

FIG. 5 is a flowchart depicting methods 500, according to the present disclosure, for collaboratively manipulating assets within a cooperative VR environment executing across multiple computing devices. As shown in FIG. 5, at operation 502, a server device transmits VR data to a first computing device. The VR data may include model data, 3D mesh data, asset data, state data, VR format files, or one or other data assemblies indicating information for enabling the first computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition, the VR data may include a stored collection of coded instructions that enable the first computing device to render an associated asset within the cooperative VR environment.

At operation 504, the first computing device renders a cooperative VR environment on a first VR display. Specifically, the first computing device renders the cooperative VR environment on the first VR display based on the VR data, such that an associated user is provided with an immersive experience within the cooperative VR environment. For example, the first computing device may render the VR environment as including assets such as structures, objects, textures, and groupings thereof. In some embodiments, the first computing device renders the cooperative VR environment on the first VR display such that the user is presented with a perspective within the cooperative VR environment consistent with the user's virtual position within the cooperative VR environment. Alternatively, or in addition, the first computing device may also render dynamic virtual representations of one or more of the first VR controllers, VR tools used by a first user associated with the first computing device user, a dynamic avatar representing the first user, previews of manipulations of assets and/or previews of assets that the first user is adding to the cooperative VR environment.

At operation 506, a server device transmits VR data to a second computing device. The VR data may include model data, 3D mesh data, asset data, state data, VR format files, or one or other data assemblies indicating information for enabling the second computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition, the VR data may include a stored collection of coded instructions that enable the second computing device to render an associated asset within the cooperative VR environment.

At operation 508, the second computing device renders a cooperative VR environment on a second VR display. Specifically, the second computing device renders the cooperative VR environment on the second VR display based on the VR data, such that an associated user is provided with an immersive experience within the cooperative VR environment. For example, the second computing device may render the VR environment as including assets such as structures, objects, textures, and groupings thereof. In some embodiments, the second computing device renders the cooperative VR environment on the second VR display such that the user is presented with a perspective within the cooperative VR environment consistent with the user's virtual position within the cooperative VR environment. Alternatively, or in addition, the second computing device may also render dynamic virtual representations of one or more of the second VR controllers, VR tools used by a second user associated with the second computing device user, a dynamic avatar representing the second user, previews of manipulations of assets and/or previews of assets that the second user is adding to the cooperative VR environment.

At operation 510, the first computing device optionally transmits first location data to the second computing device. The first location data indicates positional information relating to the virtual location of the first user associated with the first computing device and/or the first VR controllers within the cooperative VR environment.

At operation 512, the second computing device optionally transmits second location data to the first computing device. The second location data indicates positional information relating to the virtual location of the second user associated with the second computing device and/or the second VR controllers within the cooperative VR environment.

At operation 514, the first computing device optionally renders a dynamic avatar associated with the second computing device within the cooperative VR environment. For example, the first computing device may be configured to utilize the second location data received from the second computing device to render a dynamic avatar that represents a virtual representation of the second user within the cooperative VR environment. The location and characteristics of the dynamic avatar may be re-rendered as new second location data is received from the second computing device. In some embodiments, the second location data further may identify a VR tool (e.g., shape adjustment tool, menu tool, translational tool, asset creation tool, etc.) that the second user is currently using, a task that the user is currently performing, an asset that the second user is currently manipulating, etc. In such embodiments, the first computing device may render dynamic virtual representations of first VR controllers associated with the second computing device, VR tools used by the second computing device, previews of manipulations of assets by the second computing device, and/or previews of assets that the second computing device is adding to the cooperative VR environment.

At operation 516, the second computing device optionally renders a dynamic avatar associated with the first computing device within the cooperative VR environment. For example, the second computing device may be configured to utilize the first location data received from the first computing device to render a dynamic avatar that represents a virtual representation of the first user within the cooperative VR environment. The location and characteristics of the dynamic avatar may be re-rendered as new first location data is received from the first computing device. In some embodiments, the first location data further may identify a VR tool (e.g., shape adjustment tool, menu tool, translational tool, asset creation tool, etc.) that the first user is currently using, a task that the user is currently performing, an asset that the first user is currently manipulating, etc. In such embodiments, the second computing device may render dynamic virtual representations of second VR controllers associated with the first computing device, VR tools used by the first computing device, previews of manipulations of assets by the first computing device, and/or previews of assets that the first computing device is adding to the cooperative VR environment.

At operation 518, the first computing device receives a user interaction corresponding to a selection to collaboratively manipulate an asset within the cooperative VR environment with the second computing device. The first computing device may determine that the user interaction corresponds to a selection to collaboratively manipulate an asset within the cooperative VR environment with the second computing device based in part on a combination of one or more user inputs from the first VR controllers (e.g., a translation of the first VR controller, a rotation of the first VR controller, an actuation of an interactive component of the first VR controller, a voice command, etc.), the second location data, or a combination thereof.

At operation 520, the second computing device receives a user interaction corresponding to a selection to collaboratively manipulate an asset within the cooperative VR environment with the first computing device. The second computing device may determine that the user interaction corresponds to a selection to collaboratively manipulate an asset within the cooperative VR environment with the first computing device based in part on a combination of one or more user inputs from the second VR controllers (e.g., a translation of the second VR controller, a rotation of the second VR controller, an actuation of an interactive component of the second VR controller, a voice command, etc.), the first location data, or a combination thereof.

At operation 522, the first computing device transmits a request to collaboratively manipulate an asset within the cooperative VR environment with the second computing device to the server device. The request to collaboratively manipulate the asset may be a data transmission (e.g., message, request, etc.) that indicates one or more of an identification of the asset, an identification of the type of manipulation requested to be performed, an identifier associated with the first computing device and second computing device or an associated first user account and second user account (e.g., usernames, passwords, account identifiers, device identification codes, etc.).

At operation 524, the second computing device optionally transmits a request to collaboratively manipulate an asset within the cooperative VR environment with the first computing device to the server device. The request to collaboratively manipulate the asset may be a data transmission (e.g., message, request, etc.) that indicates one or more of an identification of the asset, an identification of the type of manipulation requested to be performed, an identifier associated with the first computing device and second computing device or an associated first user account and second user account (e.g., usernames, passwords, account identifiers, device identification codes, etc.).

At operation 526, the server device determines whether to assign permission to collaboratively manipulate the asset. In some embodiments, the server device determines whether to assign permission to collaboratively manipulate the asset based on a current permission status of the asset. The permission status of an asset may include, but is not limited to, any one of: available for manipulation, available for manipulation of a particular type, locked for manipulation, locked for manipulation of a particular type, etc. In some embodiments, the server device determines the permission status of an asset within the cooperative VR environment based on a permission schedule stored in a memory accessible to the server device.

Where the server device determines that the permission status of the asset requested to be modified is locked for manipulation and/or locked for the type of manipulation that the first computing device and the second computing device are requesting to perform, the process continues at operation 528, and the server device rejects the request to collaboratively manipulate the asset. In some embodiments, rejecting the request to collaboratively manipulate the asset may include transmitting a data signal to the first computing device and/or the second computing device that indicates that the asset is locked for manipulation, or is otherwise unavailable to be collaboratively modified. The process then continues at operation 518, where the first computing device receives another user interaction corresponding to a selection to manipulate an asset within the cooperative VR environment.

Alternatively, where the server device determines that the permission status of the asset requested to be modified is available for manipulation and/or available for the type of manipulation that the first computing device and the second computing device are requesting to perform, the process continues at operation 530 and the server device transmits a first data signal that enables the first computing device to collaboratively manipulate the asset. In some embodiments, the first data signal may include a notification that the first computing device has been assigned permission to collaboratively manipulate the asset and/or VR data that enables the first computing device to collaboratively manipulate the asset. In some embodiments, the server device also transmits a second data signal that indicates that the first computing device has been assigned permission to collaboratively manipulate the asset.

At operation 532, the second computing device receives a user interaction corresponding to a manipulation of the asset to become a modified version of the asset. The user interaction may be received via one or more inputs from the second VR controllers that correspond to a manipulation of the asset within the cooperative VR environment such that the asset has become a modified version of the asset.

At operation 534, the second computing device transmits a third location data to the first computing device. The third location data indicates positional information relating to the user interaction received by the second computing device and corresponding to a manipulation of the asset to become a modified version of the asset.

At operation 536, the first computing device receives a user interaction corresponding to a manipulation of the asset to become a modified version of the asset. The user interaction may be received via one or more inputs from the first VR controllers that correspond to a manipulation of the asset within the cooperative VR environment such that the asset has become a modified version of the asset.

At operation 538, the first computing device transmits a data signal to the server device that indicates that the asset has been collaboratively manipulated to become a modified version of the asset. The first computing device may generate the data signal based on a combination of the user interaction corresponding to a manipulation of the asset to become a modified version of the asset and the third location data. For example, where the first computing device and the second computing device are collaboratively resizing an asset within the cooperative VR environment, the data signal may be generated based on a first virtual location of the first VR controllers and a second virtual location of the second VR controllers. The data signal may include data that describes the manipulation of the asset, such as a type of modification(s) performed and the result of the modification(s) performed, a link to a location where one or more master versions of VR files are stored in an asset database, etc.

At operation 540, the server device updates the master versions of the VR state files based on the data signal. In some embodiments, in response to the server device receiving a data signal from the first computing device indicating that the first computing device and the second computing device have performed a collaborative modification of an asset, the server device modifies the master versions of the master VR state files stored on a memory accessible to the server device to reflect that the asset has been modified. For example, where the data signal indicates that the first computing device and the second computing device have completed a collaborative manipulation of an asset within the cooperative VR environment, such that the asset within the cooperative VR environment has become a modified version of the asset, the server device may modify one or more of the master versions of the master VR state files so that they indicate that the asset within the cooperative VR environment is the modified version of the asset.

At operation 542, the server device transmits update data to the second computing device. Specifically, the server device transmits update data to the second computing device that causes the second computing device to render an updated version of the cooperative VR environment, where the asset within the updated version of the cooperative VR environment is the modified version of the asset. At operation 544, the second computing device renders an updated version of the cooperative VR environment in which the asset is the modified version of the asset.

Figure 6:
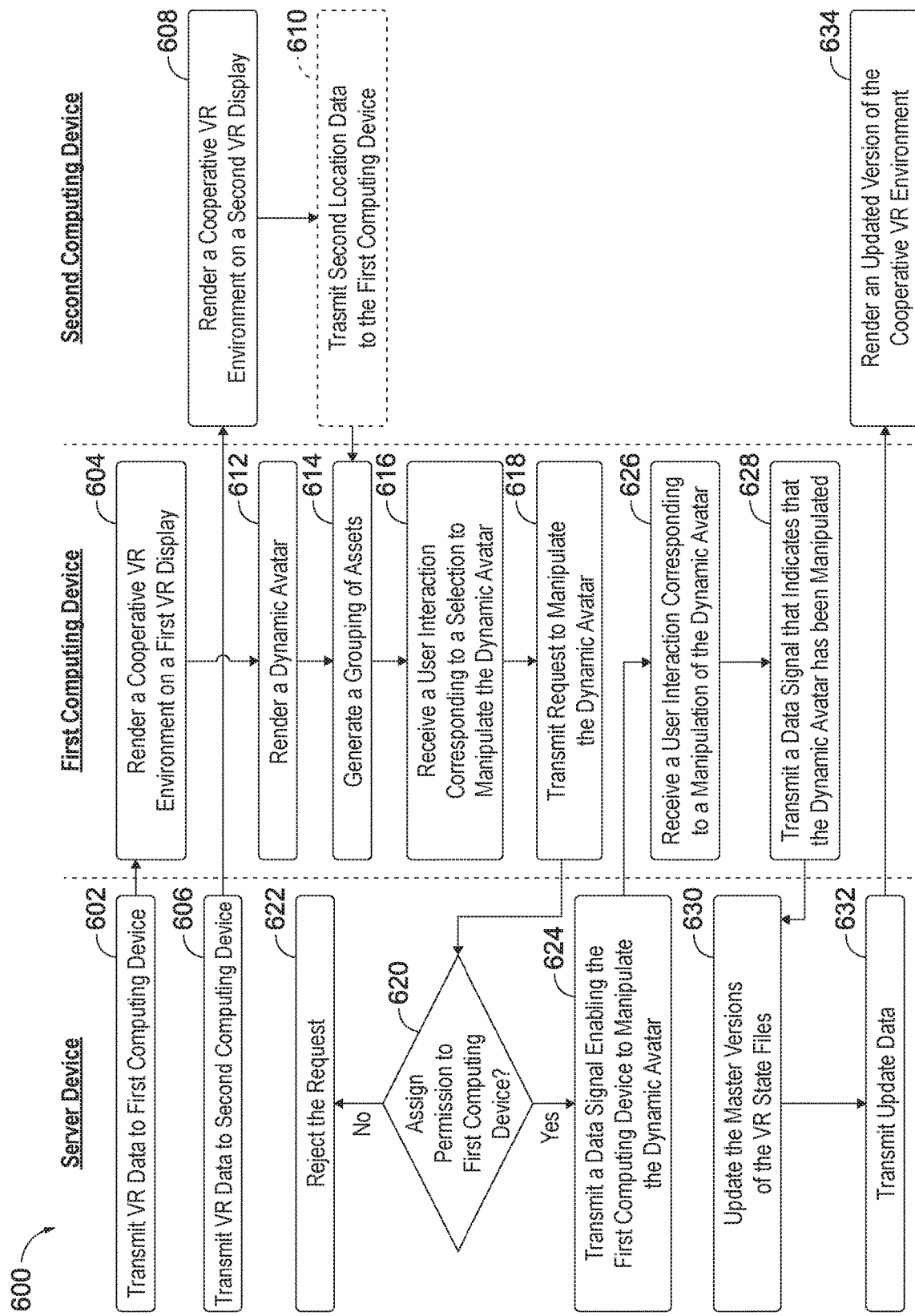
FIG. 6 is flowchart depicting methods for dynamically manipulating the VR perspective of other users in a cooperative VR environment.

FIG. 6 is a flowchart depicting methods 600, according to the present disclosure, for dynamically manipulating the VR perspective of other users in a cooperative VR environment. As shown in FIG. 6, at operation 602, a server device transmits VR data to a first computing device. The VR data may include model data, 3D mesh data, asset data, state data, VR format files, or one or other data assemblies indicating information for enabling the first computing device to render and/or interact with the cooperative VR environment or component elements thereof (e.g., objects, structures, textures, materials, groups, etc.).

At operation 604, the first computing device renders a cooperative VR environment on a first VR display. Specifically, the first computing device renders the cooperative VR environment on the first VR display based on the VR data, such that an associated user is provided with an immersive experience within the cooperative VR environment. In some embodiments, the first computing device renders the cooperative VR environment on the first VR display such that the user is presented with a perspective within the cooperative VR environment consistent with the user's virtual position within the cooperative VR environment. Alternatively, or in addition, the first computing device may also render dynamic virtual representations of one or more of the first VR controllers, VR tools used by a first user associated with the first computing device user, a dynamic avatar representing the first user, previews of manipulations of assets, and/or previews of assets that the first user is adding to the cooperative VR environment.

At operation 606, a server device transmits VR data to a second computing device. The VR data may include model data, 3D mesh data, asset data, state data, VR format files, or one or other data assemblies indicating information for enabling the second computing device to render and/or interact with the cooperative VR environment or component elements thereof (e.g., objects, structures, textures, materials, groups, etc.).

At operation 608, the second computing device renders a cooperative VR environment on a second VR display. Specifically, the second computing device renders the cooperative VR environment on the second VR display based on the VR data, such that an associated user is provided with an immersive experience within the cooperative VR environment. In some embodiments, the second computing device renders the cooperative VR environment on the second VR display such that the user is presented with a perspective within the cooperative VR environment consistent with the user's virtual position within the cooperative VR environment. Alternatively, or in addition, the second computing device may also render dynamic virtual representations of one or more of the second VR controllers, VR tools used by a second user associated with the second computing device user, a dynamic avatar representing the second user, previews of manipulations of assets and/or previews of assets that the second user is adding to the cooperative VR environment.

At operation 610, the second computing device transmits second location data to the first computing device. The second location data indicates positional information relating to the virtual location of the second user associated with the second computing device and/or the second VR controllers within the cooperative VR environment.

At operation 612, the first computing device optionally renders a dynamic avatar associated with the second computing device within the cooperative VR environment. For example, the first computing device may be configured to utilize the second location data received from the second computing device to render a dynamic avatar that represents a virtual representation of the second user within the cooperative VR environment. The location and characteristics of the dynamic avatar may be re-rendered as new second location data is received from the second computing device. In some embodiments, the second location data further may identify a VR tool (e.g., shape adjustment tool, menu tool, translational tool, asset creation tool, etc.) that the second user is currently using, a task that the user is currently performing, an asset that the second user is currently manipulating, etc. In such embodiments, the first computing device may render dynamic virtual representations of first VR controllers associated with the second computing device, VR tools used by the second computing device, previews of manipulations of assets by the second computing device, and/or previews of assets that the second computing device is adding to the cooperative VR environment.

At operation 614, the server device generates a grouping of assets within the cooperative VR environment that includes the dynamic avatar. For example, where a user associated with the second computing device is located within a room of a building, the server device may generate a grouping of assets within the room that includes the dynamic avatar. In some embodiments, the server device may store hierarchical associations between groups of assets within the cooperative VR environment. For example, in an embodiment where the cooperative VR environment includes a cityscape, the server device may store a grouping of buildings within a city block, an individual grouping of floors for each building, an individual grouping of rooms for each floor of each building, an individual grouping of assets within each room, groupings of related assets within each grouping of assets within each room (e.g., kitchen appliances, table and chairs, a furniture set, etc.). In some embodiments, each grouping hierarchically below a higher grouping is included within the higher grouping (e.g., the grouping of assets within a room within a building is included in the grouping of floors for that building). Additionally, a manipulation of a higher hierarchical group may also be applied to the assets within a lower hierarchical group. For example, in response to a translation of a room, each of the assets within the room may also receive the same translation.

In some embodiments, generating the grouping of assets may correspond to the server device determining the second computing device is virtually located near and/or interacting with a particular stored hierarchical group of assets, and then automatically adding the dynamic avatar to the particular stored hierarchical group of assets. Then, if the server device determines that the second computing device is no longer virtually located near and/or is no longer interacting with the particular stored hierarchical group of assets, the server device may automatically remove the dynamic avatar from the particular stored hierarchical group of assets.

At operation 616, the first computing device receives a user interaction corresponding to a selection to manipulate the dynamic avatar within the cooperative VR environment. The first computing device may determine that the user interaction corresponds to a selection to collaboratively manipulate an asset within the cooperative VR environment with the second computing device based in part on a combination of one or more user inputs from the first VR controllers (e.g., a translation of the first VR controller, a rotation of the first VR controller, an actuation of an interactive component of the first VR controller, a voice command, etc.), the second location data, or a combination thereof. In some embodiments, the selection to collaboratively manipulate the asset may correspond to a request to manipulate a hierarchical grouping of assets that includes the dynamic avatar.

At operation 618, the first computing device transmits a request to manipulate the dynamic avatar within the cooperative VR environment. The request to manipulate the dynamic avatar may be a data transmission (e.g., message, request, etc.) that indicates one or more of an identification of the dynamic avatar, an identification of a type of manipulation requested to be performed, an identifier associated with the first computing device or an associated first user account (e.g., usernames, passwords, account identifiers, device identification codes, etc.).

At operation 620, the server device determines whether to assign permission to manipulate the dynamic avatar to the first computing device. In some embodiments, the server device determines whether to assign permission to manipulate the dynamic avatar based on a current permission status of the dynamic avatar and/or group of assets that includes the dynamic avatar. The server device may determine the permission status of an asset within the cooperative VR environment based on a permission schedule stored in a memory accessible to the server device. The permission status of the dynamic avatar may include, but is not limited to, any one of: available for manipulation, available for manipulation of a particular type, locked for manipulation (i.e., currently being manipulated by a computing device and not available for manipulation by another user), locked for manipulation of a particular type (and not available for manipulation of the same type by another user), locked for manipulation of a grouping of assets that includes the dynamic avatar, locked for manipulation of a particular type of a grouping of assets that includes the dynamic avatar, etc.

Where the request corresponds to a request to manipulate a hierarchical group of assets that includes the dynamic avatar, the server device may determine the permission status of one or more assets within the hierarchical group. Additionally, for some types of manipulations, a manipulation of an individual asset can be done concurrently with the same type of manipulation of a group of assets that includes the individual assets. For example, where the server device may assign permission to the first computing device to translate a room that contains a table and the dynamic avatar associated with the second computing device, while also assigning permission to translate the table within the room to the second computing device.

If the server device determines that the permission status of the dynamic avatar requested to be modified is locked for manipulation and/or locked for the type of manipulation that the first computing device is requesting to perform, the process continues at operation 622, and the server device rejects the request to manipulate the dynamic avatar. In some embodiments, rejecting the request to manipulate the dynamic avatar may include transmitting a data signal to the first computing device that indicates that the dynamic avatar is locked for manipulation, or is otherwise unavailable to be modified by the first computing device. The process then continues at operation 616, where the first computing device receives another user interaction corresponding to a selection to manipulate an asset within the cooperative VR environment.

Alternatively, where the server device determines that the permission status of the dynamic avatar requested to be modified is available for manipulation and/or available for the type of manipulation that the first computing device is requesting to perform, the process continues at operation 624 and the server device transmits a data signal that enables the first computing device to manipulate the dynamic avatar and/or a hierarchical group containing the dynamic avatar. In some embodiments, the data signal may include a notification that the first computing device has been assigned permission to manipulate the dynamic avatar, and/or VR data that enables the first computing device to manipulate the dynamic avatar. In some embodiments, the server device also may compress and/or encrypt the VR data before transferring it to the first computing device.

At operation 626, the first computing device receives a user interaction corresponding to a manipulation of the dynamic avatar to become a modified version of the dynamic avatar. For example, the manipulation of the dynamic avatar may correspond to a translation of the dynamic avatar to a new virtual location within the cooperative VR environment.

At operation 628, the first computing device transmits a data signal to the server device that indicates that the dynamic avatar has been manipulated to become a modified version of the dynamic avatar. The data signal may include data that describes the manipulation of the dynamic avatar, such as a type of modification(s) performed (e.g., translation, reorientation, resizing, distortion, etc.) and the result of the modification(s) performed (e.g., positional information indicating the VR location of the modified version of the dynamic avatar within the cooperative VR environment), etc.

At operation 630, the server device updates the master versions of the VR state files based on the data signal. In some embodiments, in response to the server device receiving a data signal from the first computing device indicating that the first computing device has performed a modification of a dynamic avatar, the server device modifies the master versions of the master VR state files stored on a memory accessible to the server device to reflect that the dynamic avatar has been modified. For example, where the data signal indicates that the computing device has completed a translation of a dynamic avatar within the cooperative VR environment, such that the dynamic avatar is at a new virtual location within the cooperative VR environment, the server device may modify one or more of the master versions of the master VR state files so that they indicate that the dynamic avatar within the cooperative VR environment is located at the new virtual location. In some embodiments, this may also involve the server device removing the dynamic avatar from a first group of assets, and associating the dynamic avatar with a new group of assets proximate to the new virtual location.

At operation 632, the server device transmits update data to the second computing device. Specifically, the server device transmits update data to the second computing device that causes the second computing device to render an updated version of the cooperative VR environment. At operation 634, the second computing device renders an updated version of the cooperative VR environment in which the asset is the modified version of the asset. Where the manipulation of the dynamic avatar corresponds to a translation of the dynamic avatar or a group of assets including the dynamic avatar, the update data causes the second computing device to render the cooperative VR environment such that a perspective of the cooperative VR environment is modified in correspondence with the translation of the avatar by the first computing device.

Figure 7:
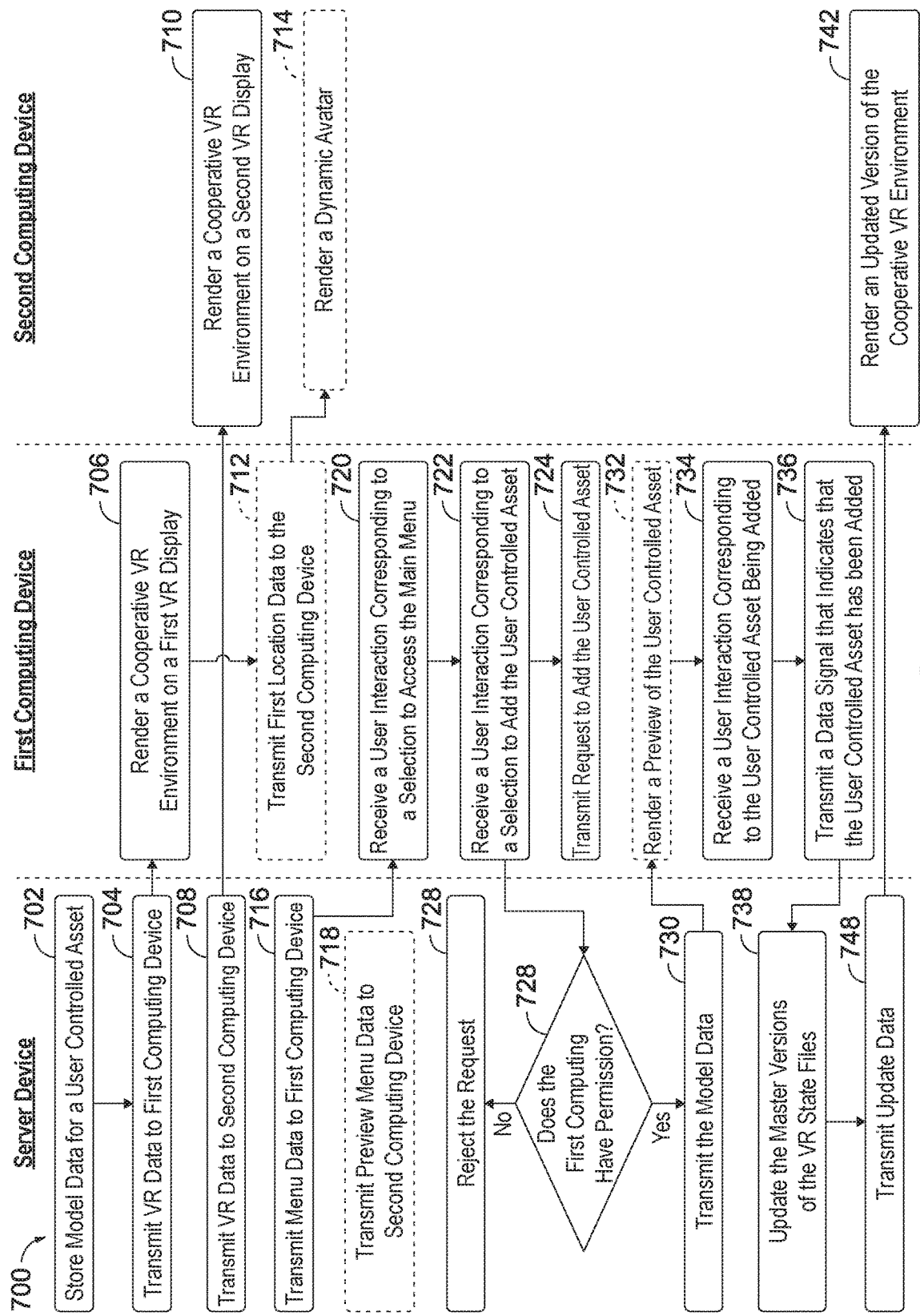
FIG. 7 is flowchart depicting methods for managing user controlled assets within one or more collaborative VR environments.

FIG. 7 is a flowchart depicting methods 700, according to the present disclosure, for managing a user controlled asset within one or more collaborative VR environments. As shown in FIG. 7, at operation 702, a server device stores model data for a user controlled asset. The model data may correspond to data that indicates the geometric properties of the object, characteristics of the object, how the object interacts with the cooperative VR environment or other objects within the cooperative VR environment, how the object can be manipulated, etc. The model data for the user controlled asset is stored on a server memory, a memory of cloud storage provider, or other memory accessible to the server device. In some embodiments, the model data for a user controlled asset may be stored within an asset database and/or in one or more sub databases or libraries that are associated with one or more user accounts and/or computing devices. In such embodiments, permission to access the model data stored in the sub databases or libraries may be limited to a particular subset of user accounts or computing devices. For example, where the model data for the user controlled asset is stored in a database for a particular project, only computing devices and/or user accounts that are approved to work on the particular project may be able to access the model data.

At operation 704, the server device transmits VR data to a first computing device. The VR data may include model data, 3D mesh data, asset data, state data, VR format files, or one or other data assemblies indicating information for enabling the first computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition the VR data may also indicate relative and/or absolute changes to any such characteristics. Alternatively, or in addition, the VR data may include a stored collection of coded instructions that enable the first computing device to render an associated asset within the cooperative VR environment.

At operation 706, the first computing device renders a cooperative VR environment on a first VR display. Specifically, the first computing device renders the cooperative VR environment on the first VR display based on the VR data, such that an associated user is provided with an immersive experience within the cooperative VR environment. For example, the first computing device may render the VR environment as including assets such as structures, objects, textures, and groupings thereof. In some embodiments, the first computing device renders the cooperative VR environment on the first VR display such that the user is presented with a perspective within the cooperative VR environment consistent with the user's virtual position within the cooperative VR environment. Alternatively, or in addition, the first computing device may also render dynamic virtual representations of one or more of the first VR controllers, VR tools used by a first user associated with the first computing device, a dynamic avatar representing the first user, previews of manipulations of assets and/or previews of assets that the first user is adding to the cooperative VR environment.

At operation 708, a server device transmits VR data to a second computing device. The VR data may include model data, 3D mesh data, asset data, state data, VR format files, or one or other data assemblies indicating information for enabling the second computing device to render and/or interact with the cooperative VR environment or component elements thereof (e.g., objects, structures, textures, materials, groups, etc.). For example, the VR data may indicate the dimensions, positions, orientations, textures, materials, groupings, or other characteristics of individual component elements of the cooperative VR environment. Alternatively, or in addition, the VR data may include a stored collection of coded instructions that enable the second computing device to render an associated asset within the cooperative VR environment.

At operation 710, the second computing device renders a cooperative VR environment on a second VR display. Specifically, the second computing device renders the cooperative VR environment on the second VR display based on the VR data, such that an associated user is provided with an immersive experience within the cooperative VR environment. For example, the second computing device may render the VR environment as including assets such as structures, objects, textures, and groupings thereof. In some embodiments, the second computing device renders the cooperative VR environment on the second VR display such that the user is presented with a perspective within the cooperative VR environment consistent with the user's virtual position within the cooperative VR environment. Alternatively, or in addition, the second computing device may also render dynamic virtual representations of one or more of the second VR controllers, VR tools used by a second user associated with the second computing device user, a dynamic avatar representing the second user, previews of manipulations of assets and/or previews of assets that the second user is adding to the cooperative VR environment.

At operation 712, the first computing device optionally transmits first location data to the second computing device. The first location data indicates positional information relating to the virtual location of the first user associated with the first computing device and/or the first VR controllers within the cooperative VR environment.

At operation 714, the second computing device optionally renders a dynamic avatar associated with the first computing device within the cooperative VR environment. For example, the second computing device may be configured to utilize the first location data received from the first computing device to render a dynamic avatar that represents a virtual representation of the first user within the cooperative VR environment. The location and characteristics of the dynamic avatar may be re-rendered as new first location data is received from the first computing device. In some embodiments, the first location data further may identify a VR tool (e.g., shape adjustment tool, menu tool, translational tool, asset creation tool, etc.) that the first user is currently using, a task that the first user is currently performing, an asset that the first user is currently manipulating, etc. In such embodiments, the second computing device may render dynamic virtual representations of second VR controllers associated with the first computing device, VR tools used by the first computing device, previews of manipulations of assets by the first computing device, and/or previews of assets that the first computing device is adding to the cooperative VR environment.

At operation 716, the server device sends menu data to the first computing device. The menu data corresponds to VR data for rendering a graphical user interface for accessing the model data for the user controlled asset. The menu data includes VR data for rendering one or more elements for allowing the first computing device or an associated user to virtually interact with the graphical user interface, such as a button, switch, slider, or other interactive element. In some embodiments, the menu data for rendering the graphical interface also includes data for rendering a visual representation of the user controlled asset within the cooperative VR environment. For example, the menu data may cause the first computing device to render a graphical user interface that includes a selectable visual representation of the user controlled asset. At operation 718, the server device optionally transmits preview menu data to the second computing device. The preview menu data corresponds to VR data for rendering a visual representation of the graphical interface.

At operation 720, the first computing device receives a first user interaction corresponding to a selection to access the menu. The first user interaction may include of one or more user inputs from a first VR controller associated with the first computing device, such as a translation of the first VR controller, a rotation of the first VR controller, an actuation of an interactive component of the first VR controller, a voice command, etc. In response to receiving the first user interaction, the first computing device renders the graphical user interface within the cooperative VR environment.

At operation 722, the first computing device receives a second user interaction corresponding to a selection to add the user controlled asset to the cooperative VR environment. The second user interaction may include one or more additional inputs from the first VR controller that correspond with a virtual interaction with a component of the graphical user interface, such as a button, switch, slider, or other interactive element.

At operation 724, the first computing device transmits a request to add the user controlled asset. The request to collaboratively add the user controlled asset may be a data transmission (e.g., message, request, etc.) that indicates one or more of an identification of the asset, an identifier associated with the first computing device and second computing device or an associated first user account and second user account (e.g., usernames, passwords, account identifiers, device identification codes, etc.).

At operation 726, the server device determines whether the first computing device has permission to add the user controlled asset. In some embodiments, the server device determines whether the first computing device has permission to add the user controlled asset based on a permission schedule. The permission schedule may identify the computing devices and/or user accounts that have permission to access the model data for the user controlled asset and/or a data library or database that contains the model data for the user controlled asset.

Where the server device determines that the computing device and/or associated user account does not have permission to access the model data for the user controlled asset and/or a data library or database that contains the model data for the user controlled asset, the process continues at operation 728, and the server device rejects the request to add the user controlled asset.

In some embodiments, rejecting the request to add the user controlled asset may include transmitting a data signal to the first computing device that indicates that the first computing device does not have permission to add the user controlled asset to the cooperative VR environment. The process then continues at operation 722, where the first computing device receives another user interaction corresponding to a selection to add a different user controlled asset to the cooperative VR environment.

Alternatively, where the server device determines that the computing device and/or associated user account has permission to access the model data for the user controlled asset and/or a data library or database that contains the model data for the user controlled asset, the process continues at operation 730 and the server device transmits the model data for the user controlled asset to the first computing device.

At operation 732, the first computing device optionally renders a preview of the user controlled asset within the cooperative VR environment. For example, the first computing device may render a dynamic virtual representation of the asset as the first computing device manipulates and/or otherwise performs actions to add the user controlled asset to the cooperative VR environment. For example, the first computing device may render a visual representation of the user controlled asset that moves within the cooperative VR environment in correspondence with a movement of a first VR controller. In this way, a user associated with the first computing device is provided with a preview of what the user controlled asset will look like in different virtual locations.

At operation 734, the first computing device receives a user interaction corresponding to the user controlled asset being added to the cooperative VR environment. The user interaction may be received via one or more inputs from the first VR controllers, such as a manipulation of the user-controlled asset within the cooperative VR environment.

At operation 736, the first computing device transmits a data signal to the server device that indicates that the user-controlled asset has been added to the cooperative VR environment. Then, at operation 738, the server device updates the master versions of the VR state files to reflect the addition of the user controlled asset based on the data signal. For example, the data signal may indicate at least one of the digital location and orientation of the particular user controlled asset within the cooperative VR environment.

At operation 740, the server device transmits update data to the second computing device. Specifically, the server device transmits update data to the second computing device that causes the second computing device to render an updated version of the cooperative VR environment that includes the user controlled asset. For example, the update data may include the model data for the user controlled asset. In this way, the update data enables the second computing device to render and/or manipulate the user controlled asset, even when the second computing device or the associated user account did not have permission to access the model data for the user controlled asset. At operation 742, the second computing device renders an updated version of the cooperative VR environment in which the asset is the modified version of the asset.

The methods 400-700 are described with reference to the environment 100 and systems 200 and 300 of FIGS. 1-3 for convenience and ease of understanding. Additionally, the method 700 is described with reference to the environment 100 and systems 200-300 of FIGS. 1-3, respectively, for convenience and ease of understanding. However, the methods 400-700 are not limited to being performed using the environment 100 and/or systems 200-300. Moreover, the environment 100 and systems 200-300 are not limited to performing the methods 400-700.

The methods 400-700 are illustrated as collections of blocks in logical flow graphs, which represents sequences of operations that may be implemented in hardware, software, or a combination thereof. In the context of software, the blocks represent computer-executable instructions stored on one or more computer-readable storage media that, when executed by one or more processors, perform the recited operations. Generally, computer executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the methods. In some embodiments, one or more blocks of the method may be omitted entirely. Moreover, the methods 400-700 may be combined in whole or in part.

The various techniques described herein may be implemented in the context of computer-executable instructions or software that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media and not limited to the forms of memory that are specifically described.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B, (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Examples of subject matter according to the present disclosure are described in the following enumerated paragraphs.

A1. A computer-implemented method for generating a cooperative virtual reality (VR) environment, the computer-implemented method comprising:
transmitting, by a server device and to a first computing device, a first file that enables the first computing device to render the cooperative VR environment;
transmitting, by the server device and to a second computing device, a second file that enables the second computing device to render the cooperative VR environment;
receiving, by the server device and from the first computing device and based on a user input received by the first computing device, a request to manipulate an asset within the cooperative VR environment;
locking, by the server device, the asset in association with the first computer; and
transmitting, by the server device and to the first computing device, permission data configured to allow the first computing device to manipulate the asset within the cooperative VR environment.

A2. The computer-implemented method of paragraph A1, further comprising receiving, by the server device and from the first computing device, modification data that indicates that a state of the asset has been manipulated by the first computing device to become a modified version of the asset, the modification data including at least positional and dimensional information describing the modified version of the asset within the cooperative VR environment.

A2.1. The computer-implemented method of paragraph A2, further comprising transmitting, by the server device and to the second computing device, update data that causes the second computing device to render the cooperative VR environment to include the modified version of the asset.

A2.2. The computer-implemented method of any of paragraphs A2-A2.1, further comprising unlocking, by the server device, the asset based on receiving the modification data indicating that the state of the asset has been manipulated.

A3. The computer-implemented method of any of paragraphs A1-A2.2, wherein the request to manipulate the asset is a first request to cooperatively manipulate the asset within the cooperative VR environment, and the computer-implemented method further comprising receiving, by the server device and from the second computing device, a second request to cooperatively manipulate the asset within the cooperative VR environment.

A3.1. The computer-implemented method of paragraph A3, further comprising assigning, by the server device, permission to manipulate the asset to the first computing device.

A3.2. The computer-implemented method of any of paragraphs A3-A3.1, further comprising receiving, by the server device and from the first computing device, collaborative modification data that indicates that the state of the asset has been collaboratively manipulated by the first computing device and the second computing device to become a collaboratively modified version of the asset, the collaborative modification data including at least positional and dimensional information describing to the collaboratively modified version of the asset within the cooperative VR environment.

A3.2.1. The computer-implemented method of paragraph A3.2, wherein the collaborative modification data is generated by the first computing device based at least in part upon: user input data from one or more VR controllers associated with the first computing device, wherein the user input data corresponds to one or more of a user selection and positional information of the one or more VR controllers associated with the first computing device; and/or location data indicating additional positional information relating to the one or more VR controllers associated with the second computing device.

A3.2.2. The computer-implemented method of any of paragraphs A3.2-A3.2.1, further comprising transmitting, by the server device and to the second computing device, additional update data that causes the second computing device to render the cooperative VR environment to include the collaboratively modified version of the asset.

A4. The computer-implemented method of any of paragraphs A1-A3.2.1, further comprising: receiving, by the server device and from the second computing device, an additional request to manipulate the asset in the cooperative VR environment; determining, by the server device, that the asset is locked in association with the first computing device; and transmitting, by the server device and to the second computing device, denial data that causes the second computing device to restrict manipulation of the asset within the cooperative VR environment.

A5. The computer-implemented method of any of paragraphs A1-A3.2.1, wherein the request is a first request to perform a first type of manipulation on the asset, and the locking the asset in association with the first computing device comprises locking the asset for the first type of manipulation.

A5.1. The computer-implemented method of paragraph A5, further comprising: receiving, by the server device and from the second computing device, an additional request to perform a second type of manipulation on the asset within the cooperative VR environment, wherein the second type of manipulation is different from the first type of manipulation; determining, by the server device, that the asset within the cooperative VR environment is locked for the first type of manipulation by the first computing device; determining, by the server device, that the asset within the cooperative VR environment is not locked for the second type of manipulation; locking, by the server device, the asset within the cooperative VR environment for the second type of manipulation by the second computing device; and transmitting, by the server device and to the second computing device, additional permission data configured to allow the second computing device to perform the second type of manipulation on the asset within the cooperative VR environment.

A6. The computer-implemented method of any of paragraphs A1-A5.1, further comprising receiving, by the sever device, a 3D file that indicates the cooperative VR environment.

A6.1. The computer-implemented method of paragraph A6.1, wherein the 3D file is a 3D mesh.

A6.2. The computer-implemented method of any of paragraphs A6-A6.1, further comprising optimizing, by the server device, the 3D file to form an optimized 3D file for the cooperative VR environment.

A6.2.1. The computer-implemented method of paragraph A6.2, wherein the optimizing comprises converting component data into one or more different compatible file types for one or more different types of computing devices.

A6.2.2. The computer-implemented method of any of paragraphs A6.2-A6.2.1, wherein the transmitting the first file that enables the first computing device to render the cooperative VR environment comprises transmitting the optimized 3D file to the first computing device.

A6.2.3. The computer-implemented method of any of paragraphs A6.2-A6.2.2, wherein the first file and the second file are optimized versions of the 3D file for the VR environment.

A6.2.4. The computer-implemented method of paragraph A6.2.3, wherein the first file and the second file are the same optimized 3D file.

A6.2.5. The computer-implemented method of any of paragraphs A6.2-A6.2.3, wherein the first file is optimized for a first type of computing device, and the second file is optimized for a second type of computing device.

A6.2.6. The computer-implemented method of any of paragraphs A6.2-A6.2.3, and A6.2.5, wherein the first file is optimized for a first type of operating system, and the second file is optimized for a second type of operating system.

A7. The computer-implemented method of any of paragraphs A1-A6.2.6, further comprising: receiving, by the server device and from the second computing device, location data indicating positional information for one or more VR controllers associated with the second computing device; and transmitting, by the server device, the location data to the first computing device, wherein the location data is configured to enable the first computing device to render a dynamic avatar for a user account associated with the second computing device within the cooperative VR environment.

A7.1. The computer-implemented method of paragraph A7.1, further comprising: receiving, by the server device from the first computing device, additional location data indicating positional information for one or more VR controllers associated with the first computing device; and transmitting, by the server device, the additional location data to the second computing device, wherein the additional location data is configured to enable the second computing device to render a dynamic avatar for a user account associated with the first computing device within the cooperative VR environment.

A7.2. The computer-implemented method of any of paragraphs A7-A7.1, wherein at least one of the location data and the additional location data are received and transmitted in a first data channel, and the modification data indicating that a state of the asset has been manipulated to become the modified version of the asset is transmitted to the first computing device and the second computing device in a second data channel.

A7.2.1. The computer-implemented method of paragraph A7.2, wherein the first data channel is a low priority data stream.

A7.2.2. The computer-implemented method of any of paragraphs A7.2-A7.2.1, wherein the second data channel is a high priority data stream.

A7.2.3. The computer-implemented method of any of paragraphs A7.2-A7.2.2, wherein the data transmitted in the second data channel includes state information of assets in the cooperative VR environment.

A7.2.4. The computer-implemented method of paragraph A7.2.3, wherein indication of the state of the assets includes positional and dimensional information about the assets in the cooperative VR environment.

A8. The computer-implemented method of any of paragraphs A1-A7.2.4, further comprising receiving, by the server device and from the first user device, instructions for building the cooperative VR environment.

A8.1. The computer-implemented method of paragraph A8, wherein the instructions are generated by the first computing device based on one or more user inputs received in association with a user experience in a VR building environment.

A8.2. The computer-implemented method of any of paragraphs A8-A8.1, wherein the one or more user inputs correspond to physical gestures captured by the VR controller associated with the first computing device.

A9. The computer-implemented method of any of paragraphs A1-A8.2, wherein the asset corresponds to one of an object, a collection, a material, and a group within the cooperative VR environment.

A10. The computer-implemented method of any of paragraphs A1-A9, further comprising storing, by the server device, asset data for a user asset in a server database associated with the user account associated with the first computing device, and wherein transmitting the first file to the first computing device comprises sending menu data for rendering a graphical user interface for accessing the server database associated with the user within the cooperative VR environment.

A10.1. The computer-implemented method of paragraph A10, wherein the menu data for rendering the graphical interface includes data for rendering a visual representation of the user asset within the cooperative VR environment.

A10.2. The computer-implemented method of any of paragraphs A10-A10.1, wherein transmitting the second file to the second computing device comprises sending additional menu data for rendering a visual representation of the graphical interface.

A10.3. The computer-implemented method of any of paragraphs A10-A10.2, further comprising receiving, by the server device from the first computing device and based on a user interaction with the graphical user interface within the cooperative VR environment, an asset request to add the user asset to the cooperative VR environment.

A10.3.1. The computer-implemented method of paragraph A10.3, further comprising: determining, by the server device, that a user account associated with the first computing device has rights to access the user asset; and based on the user account associated with the first computing device having rights to access the user asset, transmitting, by the server device, model data for rendering the user asset within the cooperative VR environment to the first computing device.

A10.3.2. The computer-implemented method of paragraph A10.3.1, further comprising storing, in the server database, a link to the cooperative VR environment.

A10.3.3. The computer-implemented method of any of paragraphs A10.3.1-A10.3.2, further comprising receiving, from the first computing device, state data for the user asset in the cooperative VR environment, wherein the state data includes at least one of positional information and dimensional information of the user asset as rendered in the cooperative VR environment.

A10.3.4. The computer-implemented method of any of paragraphs A10.3.1-A10.3.3, further comprising transmitting, by the server device and to the second computing device and based on the state data, asset data that causes the second computing device to render the user asset as rendered by the first computing device in the cooperative VR environment.

A10.3.5. The computer-implemented method of paragraph A10.3.4, wherein the state data for rendering the user asset includes a link to the user asset as stored in the server database.

A10.3.6. The computer-implemented method of any of paragraphs A10.3.4-A10.3.5, wherein transmitting the state data for rendering the user asset enables a user account associated with the second computing device to manipulate the user asset within the cooperative VR environment.

A10.3.7. The computer-implemented method of paragraph A10.3.6, wherein the user account associated with the second computing device does not have permission to access the user asset.

A10.3.8. The computer-implemented method of any of paragraphs A10.3.3-A.10.3.7, wherein the at least one of positional information and dimensional information is relative to a reference positional and/or dimensional information.

A10.3.9. The computer-implemented method of any of paragraphs A10.3.3-A.10.3.7, wherein the at least one of positional information and dimensional information is expressed in absolute quantities.

A11. The computer-implemented method of any of paragraphs A10-A10.3.9, further comprising: receiving, by the server device, a manipulation of the user asset stored in the server database that causes the user asset to become a modified version of the user asset; and transmitting, based on the manipulation of the user asset stored in the server and to the first computing device and the second computing device, user asset update data that causes the first computing device and the second computing device to render the user asset as the modified version of the user asset within the cooperative VR environment.

A11.1. The computer-implemented method of paragraph A11, wherein the user asset update data is configured to cause the first computing device and the second computing device to update a rendering of the user asset in the cooperative VR environment to be a rendering of the modified version of the user asset.

A11.2. The computer-implemented method of paragraph A11, wherein the manipulation of the user asset stored in the server is a deletion of the user asset, and the user asset update data is configured to cause the first computing device and the second computing device to render the cooperative VR environment without the user asset.

A12. The computer-implemented method of any of paragraphs A7-A11.2, wherein the asset is a group of one or more assets in the cooperative VR environment, and further comprising associating the dynamic avatar of the user account associated with the first computing device with the group of one or more assets.

A12.1. The computer-implemented method of paragraph A12, receiving, from the second computing device, a group manipulation of the group of one or more assets; and based on the group manipulation of the group of one or more assets, transmitting to the first computing device, group manipulation data configured to cause the first computing device to apply the group manipulation to the first computing device's rendering of the cooperative VR environment.

A12.2. The computer-implemented method of paragraph A12.1, wherein the group manipulation is received based on a gesture of the second VR controller associated with the second computing device.

A12.3. The computer-implemented method of any of paragraphs A12.1-A12.2, further comprising applying, by the first computing device, the group manipulation to the first computing device's rendering of the cooperative VR environment effects a virtual experience of the user account associated with the first computing device.

A12.4. The computer-implemented method of any of paragraphs A12.1-A12.2, wherein the group manipulation of the group of one or more assets corresponds to a translation of the group of one or more assets within the cooperative VR environment rendered by the second computing device, and wherein the perspective of the cooperative VR environment rendered by the first computing device is modified in correspondence with the translation of the group of one or more assets.

A13. The computer-implemented method of any of paragraphs A7-A11.2, further comprising, receiving, from the second computing device, an avatar manipulation of the dynamic avatar of the user account associated with the first computing device; and based on the group manipulation of the group of one or more assets, transmitting, by the server device and to the first computing device, manipulation data configured to cause the first computing device to apply the avatar manipulation to the first computing device's rendering of the cooperative VR environment.

A13.1. The computer-implemented method of paragraph 13, wherein the avatar manipulation is received based on a gesture of the one or more VR controllers associated with the second computing device.

A13.2. The computer-implemented method of any of paragraphs A13-A13.1, wherein the avatar manipulation corresponds to a translation of the dynamic avatar within the cooperative VR environment rendered by the second computing device, and wherein the perspective of the cooperative VR environment rendered by the first computing device is modified in correspondence with the translation of the dynamic avatar.

B1. A computer-implemented method for distributing data for use in a cooperative virtual reality (VR) environment, comprising:

storing, by a server device, asset data for a user asset within a server database associated with a user account, transmitting, by the server device and to a first computing device associated with the user account, menu data configured to cause the first computing device to render a graphical user interface for accessing the server database within the cooperative VR environment;

transmitting, by the server device and to a second computing device associated with an additional user, additional menu data configured to cause the second computing device to render a visual representation of the graphical user interface within the cooperative VR environment;

receiving, by the server device from the first computing device and based on a user interaction with the graphical user interface rendered within the cooperative VR environment, a request to add the user asset to the cooperative VR environment;

determining, by the server device, that the user account associated with the first computing device has rights to the user asset;

transmitting, by the server device and to the first computing device, model data configured to cause the first computing device to render the user asset within the cooperative VR environment;

receiving, by the server device and from the first computing device, state data for the user asset in the cooperative VR environment, wherein the state data includes at least one of positional information and dimensional information for the user asset within the cooperative VR environment; and transmitting, by the server device to the second computing device and in response to the state data, additional model data configured to cause the second computing device to render the user asset in the cooperative VR environment, wherein the additional model data includes the state data.

B2. The computer-implemented method of paragraph B1, wherein the additional model data is further configured to enable the second computing device to manipulate the user asset within the cooperative VR environment.

B3. The computer-implemented method of any of paragraphs B1-B2, wherein an additional user associated with the second computing device does not have permission to access the user asset.

B4. The computer-implemented method of any of paragraphs B1-B3, further comprising storing, in the server database, a link to the cooperative VR environment.

B5. The computer-implemented method of any of paragraphs B1-B4, further comprising: receiving a manipulation of the user asset stored in the server database to become a modified version of the user asset; and transmitting, based on the manipulation of the user asset stored in the server database and to the first computing device and the second computing device, update data configured to cause the first computing device and the second computing device to render the modified version of the user asset within the cooperative VR environment.

B5.1. The computer-implemented method of paragraph B5, wherein the update data is configured to cause the first computing device and the second computing device to update the rendering of the user asset in the cooperative VR environment so that it is a rendering of the modified version of the user asset.

B5.2. The computer-implemented method of paragraph B5, wherein the manipulation of the user asset stored in the server is a deletion of the user asset, and the update data is configured to cause the first computing device and the second computing device to render the cooperative VR environment without the user asset.

C1. A computer-implemented method for manipulating the virtual reality (VR) experience of another user account in a cooperative VR environment, the computer-implemented method comprising:
transmitting, by a server and to a first computing device associated with a first user, a first file configured to cause the first computing device to render the cooperative VR environment, wherein the rendering of the cooperative VR environment by the first computing device includes a dynamic avatar of a user account associated with a second computing device;
transmitting, by the server and to the second computing device associated with a second user, a second file configured to cause the second computing device to render the cooperative VR environment;
receiving, by the server and from the first computing device, manipulation data indicating a manipulation of the dynamic avatar within the rendering of the cooperative VR environment by the first computing device; and
based on the manipulation data indicating the manipulation of the dynamic avatar, transmitting to the second computing device, update data configured to cause the second computing device to apply the manipulation of the dynamic avatar to the second computer's rendering of the cooperative VR environment.

C2. The computer-implemented method of paragraph C1, wherein the manipulation data indicating the manipulation of the dynamic avatar is received based on a gesture of a VR controller associated with the first computing device.

C3. The computer-implemented method of any of paragraphs C1-C2, wherein the manipulation of the dynamic avatar corresponds to a translation of the dynamic avatar within the cooperative VR environment rendered by the first computing device, and wherein the update data is configured to cause the second computing device to render the cooperative VR environment such that a perspective of the cooperative VR environment rendered by the second computing device is modified in correspondence with the translation of the dynamic avatar.

C4. The computer-implemented method of any of paragraphs C1-C3, wherein the cooperative VR environment includes an asset, and the computer-implemented method further comprises associating the dynamic avatar with the asset to form an asset group.

C5. The computer-implemented method of paragraph C4, wherein the manipulation of the dynamic avatar corresponds to a manipulation of the asset group, and wherein the update data is configured to further cause the second computing device to render the asset in correspondence with the manipulation of the asset group.

D1. A computer-implemented method for providing a cooperative virtual reality (VR) environment, the computer-implemented method comprising:
receiving, from a server and by a first computing device, a VR file for the cooperative VR environment, the VR file including data configured to cause the first computing device to render an asset within the cooperative VR environment;
rendering, by the first computing device and based on the VR file, the cooperative VR environment including the asset on a display associated with the first computing device;
receiving, over a first type of data channel, location data indicating positional information relating to one or more VR controllers associated with a second computing device;
rendering, by the first computing device and based on the location data, an avatar representation of a user account associated with the second computing device within the cooperative VR environment;
receiving, from the server and over a second type of data channel, status data that indicates that the asset has been manipulated by the second computing device to become a modified version of the asset, wherein the second type of data channel is different form the first type of data channel; and
rendering, by the first computing device and based on the status data, the cooperative VR environment including the modified version of the asset.

D2. The computer-implemented method of paragraph D1, wherein the VR file further includes model data for rendering the cooperative VR environment.

D3. The computer-implemented method of any of paragraphs D1-D2, further comprising: receiving user input data from one or more VR controllers associated with the first computing device, wherein the user input data corresponds to one or more of a user selection and positional information of the one or more VR controllers associated with the first computing device; and determining that the user input data corresponds to a selection of a tool in the cooperative VR environment.

D4. The computer-implemented method of any of paragraphs D1-D2, further comprising: receiving user input data from one or more VR controllers associated with the first computing device, wherein the user input data corresponds to one or more of a user selection and positional information of the one or more VR controllers associated with the first computing device; and determining that the user input data corresponds to a selection of the asset within the cooperative VR environment.

E1. A computer-implemented method for manipulating an asset within a cooperative virtual reality VR environment, the computer-implemented method comprising:
receiving, from a server and by a first computing device, a VR file for the cooperative VR environment, the VR file including data configured to cause the first computing device to render an asset within the cooperative VR environment;

rendering, by the first computing device and based on the VR file, the cooperative VR environment including the asset on a display associated with the first computing device;

receiving location data indicating positional information relating to one or more VR controllers associated with a second computing device;

rendering, by the first computing device and based on the location data, an avatar representation of a user account associated with the second computing device within the cooperative VR environment;

receiving user input data from one or more VR controllers associated with the first computing device, wherein the user input data corresponds to one or more of a user selection and positional information of the one or more VR controllers associated with the first computing device; and determining that the user input data corresponds to a selection of the asset within the cooperative VR environment.

E2. The computer-implemented method of paragraph E1, further comprising, based on the determining that the user input data corresponds to a selection of the asset, transmitting to the server a request to manipulate the asset.

E2.1. The computer-implemented method of paragraph E2, wherein the request to manipulate the asset comprises a request to perform a type of manipulation of the asset.

E3. The computer-implemented method of any of paragraphs E2-E2.1, further comprising: receiving, from the server and in response to the asset within the cooperative VR environment being locked for manipulation by the user account, a notification that the asset cannot be manipulated; and generating, within the cooperative VR environment, a visual or auditory signal that the asset cannot be manipulated.

E3.1. The computer-implemented method of paragraph E3, wherein the visual or auditory signal corresponds to the first computing device rendering the cooperative VR environment such that the asset cannot be selected and/or manipulated by the first computing device.

E3.2. The computer-implemented method of any of paragraphs E3-E3.1, wherein the asset within the cooperative VR environment being locked for manipulation corresponds to the asset within the cooperative VR environment being locked for a same type of manipulation as the type of manipulation in the request to manipulate the asset.

E4. The computer-implemented method of any of paragraphs E2-E2.1, further comprising: receiving, from the server and in response to the asset within the cooperative VR environment not being locked for manipulation by another user account associated within the cooperative VR environment, a notification that the asset can be manipulated; and providing, within the cooperative VR environment, a visual or auditory signal that the asset has been selected.

E4.1. The computer-implemented method of paragraph E4, wherein the visual or auditory signal corresponds to the first computing device rendering the cooperative VR environment such that the asset can be manipulated by the first computing device.

E4.2. The computer-implemented method of any of paragraphs E4-E4.1, wherein the asset within the cooperative VR environment not being locked for manipulation corresponds to the asset within the cooperative VR environment not being locked for a same type of manipulation as the type of manipulation in the request to manipulate the asset.

E4.3. The computer-implemented method of any of paragraphs E4-E4.2, wherein the asset within the cooperative VR environment not being locked for manipulation corresponds to the asset within the cooperative VR environment being locked for a different type of manipulation as the type of manipulation in the request to manipulate the asset.

E5. The computer-implemented method of any of paragraphs E4-E4.3, further comprising: receiving additional user input data from the one or more VR controllers; manipulating the asset within the cooperative VR environment based on the additional user input data to form a modified version of the asset; and transmitting, to the server, additional state data that indicates that the state of the asset has been manipulated to become the modified version of the asset.

E5.1. The computer-implemented method of paragraph E5, wherein the state data is transmitted to the server by a second type of data channel.

E5.2. The computer-implemented method of any of paragraphs E5-E5.1, wherein the additional state data describes at least one of positional information and dimensional information of the modified version of the asset within the cooperative VR environment.

E6. The computer-implemented method of any of paragraphs E1-E5.2, further comprising: receiving user input data from one or more VR controllers associated with the first computing device, wherein the user input data corresponds to one or more of a user selection and positional information of the one or more VR controllers associated with the first computing device; receiving additional location data indicating additional positional information relating to the one or more VR controllers associated with the second computing device; and determining, by the first computing device, that the user input data and the additional location data correspond to a cooperative selection of the asset within the cooperative VR environment.

F1. A computer-implemented method for cooperatively manipulating an asset within a cooperative virtual reality (VR) environment, the computer-implemented method comprising:

receiving, from a server and by a first computing device, a VR file for the cooperative VR environment, the VR file including data configured to cause the first computing device to render an asset within the cooperative VR environment;

rendering, by the first computing device and based on the VR file, the cooperative VR environment including the asset on a display associated with the first computing device;

receiving location data indicating positional information relating to one or more VR controllers associated with a second computing device;

rendering, by the first computing device and based on the location data, an avatar representation of a user account associated with the second computing device within the cooperative VR environment;

receiving user input data from one or more VR controllers associated with the first computing device, wherein the user input data corresponds to one or more of a user selection and positional information of the one or more VR controllers associated with the first computing device;

receiving additional location data indicating additional positional information relating to the one or more VR controllers associated with the second computing device; and determining, by the first computing device, that the user input data and the additional location data correspond to a cooperative selection of the asset within the cooperative VR environment.

F2. The computer-implemented method of paragraph F1, further comprising, based on the determining that the user input data and the additional location data correspond to the cooperative selection of the asset, transmitting to the server a request to cooperatively manipulate the asset.

F2.1. The computer-implemented method of paragraph F2, further comprising, based in part on the server assigning permission to manipulate the asset to the first computing device: receiving, by the first computing device, additional user input data from the one or more VR controllers corresponding to manipulation of the asset; receiving, by the first computing device, further location data from the second computing device, the further location data indicating further positional information relating to the one or more VR controllers, and corresponding to user inputs to manipulate the asset; and transmitting, to the server and based on the additional user input data and the further location data, additional state data that indicates the state of the asset has been cooperatively manipulated by the first computing device and the second computing device to become a cooperatively modified version of the asset.

F2.1.1. The computer-implemented method of paragraph F2.1, wherein based on the transmitting the additional state data, the server updates one or more master files associated with the cooperative VR environment such that the asset within the cooperative VR environment is the cooperatively modified version of the asset.

F2.1.2. The computer-implemented method of any of paragraphs F2.1-F2.1.1, wherein, based on the transmitting the additional state data, the server is configured to transmit to the second computing device a notification that the asset has been cooperatively manipulated by the first computing device and the second computing device to become the cooperatively modified version of the asset.

F2.1.2.1. The computer-implemented method of paragraph F2.1.2, wherein the notification that the asset has been cooperatively manipulated includes state information that describes at least a positional and dimensional state of the cooperatively modified version of the asset within the cooperative VR environment.

F2.1.3. The computer-implemented method of any of paragraphs F2.1.1-F2.1.2.1, wherein the additional state data is transmitted to the server by a second type of data channel.

F2.1.4. The computer-implemented method of any of paragraphs F2.1.1-F2.1.3, wherein the additional state data further describes at least one of positional and dimensional information of the cooperatively modified version of the asset within the cooperative VR environment.

F3. The computer-implemented method of paragraph F1, further comprising, based in part on the server assigning permission to manipulate the asset to the second computing device:

transmitting, to the second computing device, additional location data indicating additional positional information relating to the one or more VR controllers associated with the first computing device and corresponding to user selections to manipulate the asset; and wherein, based on the additional location data indicating the additional positional information relating to the one or more VR controllers associated with the first computing device and further user inputs from the one or more VR controllers associated with the second computing device, the second computing device is configured to transmit to the server additional state data that indicates that the state of the asset has been cooperatively manipulated by the first computing device and the second computing device to become a cooperatively modified version of the asset.

F3.1. The computer-implemented method of paragraph F3, wherein the additional location data indicating positional information relating to the one or more VR controllers associated with the first computing device is transmitted to the second computing device in a first type of data channel.

F3.2. The computer-implemented method of any of paragraphs F3-F3.1, wherein the additional state data is transmitted to the server in a second type of data channel.

F3.3. The computer-implemented method of any of paragraphs F3-F3.2, wherein the additional state data further describes at least one of positional and dimensional information of the cooperatively modified version of the asset within the cooperative VR environment.

F4. The computer-implemented method of any of paragraphs F1-F3.3, further comprising: receiving, from the second computing device, a notification that an avatar of a user account associated with the first computing device has been translated within the cooperative VR environment rendered by the second computing device, and based on the notification that the avatar of the user account associated with the first computing device has been translated, rendering the cooperative VR environment such that a perspective of the cooperative VR environment is modified in correspondence with the translation.

G1. A computer-implemented method for allowing cooperative perspective manipulation within a cooperative virtual reality (VR) environment, the computer-implemented method comprising:

receiving, from a server and by a first computing device associated with a first user account, a VR file for the cooperative VR environment, the VR file including data configured to cause the first computing device to render an asset within the cooperative VR environment;

rendering, by the first computing device and based on the VR file, the cooperative VR environment including the asset on a display associated with the first computing device;

receiving location data indicating positional information relating to one or more VR controllers associated with a second computing device;

rendering, by the first computing device and based on the location data, an avatar representation of a second user account associated with the second computing device within the cooperative VR environment;

receiving, from the second computing device, a notification that an avatar of the first user account has been translated by the second user account within the cooperative VR environment rendered by the second computing device, and based on the notification that the avatar of the first user account has been translated, rendering the cooperative VR environment such that a perspective of the cooperative VR environment is modified in correspondence with the translation.

G2. The computer-implemented method of paragraph G1, further comprising: receiving additional user input data from one or more VR controllers associated with the first computing device, wherein the additional user input data indicates a gesture corresponding to a translation of the avatar associated with the second user account; and based on the additional user input data, transmitting a notification that the avatar of the second user account has been translated by the first user account within the cooperative VR environment rendered by the first computing device, wherein the notification causes the second computing device to render the cooperative VR environment such that a perspective of the cooperative VR environment is modified in correspondence with the translation of the avatar by the first user account.

H1. A computer-implemented method for manipulating a perspective of an additional user account within a cooperative virtual reality (VR) environment, the computer-implemented method comprising:

receiving, from a server and by a first computing device associated with a user account, a VR file for the cooperative VR environment, the VR file including data configured to cause the first computing device to render an asset within the cooperative VR environment;

rendering, by the first computing device and based on the VR file, the cooperative VR environment including the asset on a display associated with the first computing device;

receiving location data indicating positional information relating to one or more VR controllers associated with a second computing device;

rendering, by the first computing device and based on the location data, an avatar representation of an additional user account associated with the second computing device within the cooperative VR environment;

receiving additional user input data from one or more VR controllers associated with the first computing device, wherein the additional user input data indicates a gesture corresponding to a translation of the avatar associated with the additional user account; and based on the additional user input data, transmitting a notification that the avatar of the additional user account has been translated by the user account within the cooperative VR environment rendered by the first computing device, wherein the notification causes the second computing device to render the cooperative VR environment such that a perspective of the cooperative VR environment is modified in correspondence with the translation of the avatar by the user account.

H2. The computer-implemented method of paragraph H1, wherein the server is configured to store a user asset in a server database associated with the user account, and further comprising receiving, from the server and by the first computing device, menu data for rendering a graphical user interface for accessing the server database associated with the user account.

I1. A computer-implemented method for distributing user controlled assets within a cooperative virtual reality (VR) environment, the computer-implemented method comprising:

receiving, from a server and by a computing device associated with a first user account, a VR file for the cooperative VR environment, the VR file including data configured to cause the first computing device to render an asset within the cooperative VR environment, wherein the server is configured to store a user asset in a server database associated with the first user account;

receiving, from the server and by the first computing device, menu data for rendering a graphical user interface for accessing the server database associated with the first user account;

rendering, by the first computing device and based on the VR file, the cooperative VR environment including the asset on a display associated with the first computing device;

receiving location data indicating positional information relating to one or more VR controllers associated with a second computing device; and rendering, by the first computing device and based on the location data, an avatar representation of a second user account associated with the second computing device within the cooperative VR environment.

I1.1. The computer-implemented method of paragraph I1, wherein the menu data for rendering the graphical interface includes preview data for a visual representation of the user asset.

I1.2. The computer-implemented method of any of paragraphs I1-I1.1, further comprising: rendering, based on the menu data, the graphical user interface within the cooperative VR environment; receiving further user input data from one or more VR controllers associated with the first computing device, wherein the further user input data indicates a further gesture corresponding to a further user interaction with the graphical user interface within the cooperative VR environment; and transmitting, to the server and based on the further user interaction, a request to add the user asset to the cooperative VR environment.

I1.2.1. The computer-implemented method of paragraph I1.2, further comprising, based on the first user account having rights to access the user asset, receiving model data for rendering the user asset from the server, and rendering the user asset within the cooperative VR environment based on the model data.

I1.2.1.1. The computer-implemented method of paragraph I1.2.1, further comprising: receiving subsequent user input data from the one or more VR controllers associated with the first computing device, wherein the subsequent user input data indicates one or more subsequent gestures corresponding to a manipulation of the user asset as rendered within the cooperative VR environment to form a modified user asset; and transmitting, to the server, state data for the user asset in the cooperative VR environment, wherein the state data includes at least one of positional information and dimensional information of the modified user asset.

I1.2.1.2. The computer-implemented method of any of paragraphs I1.2.1-I1.2.1.1, wherein the server is configured to transmit the model data for rendering the user asset to the second computing device based on the first computing device transmitting the state data.

I1.2.2. The computer-implemented method of any of paragraphs I1.2.1-I1.2.1.2, wherein the model data for rendering the user asset includes a link to the user asset as stored in the server database.

I1.2.3. The computer-implemented method of any of paragraphs I1.2.1-I1.2.2, wherein the model data for rendering the user asset allows the second user account associated with the second computing device to manipulate the user asset within the cooperative VR environment.

I1.2.3.1. The computer-implemented method of paragraphs I1.2.3, wherein the second user account does not have permission to access the user asset.

I1.3. The computer-implemented method of any of paragraphs I1-I1.2.3.1, further comprising, based on the server receiving the manipulation of the user asset stored in the server database to become a modified version of the user asset, receiving, from the server, update data that causes the first computing device to update the rendering of the user asset in the cooperative VR environment so that it becomes a rendering of the modified version of the user asset.

I1.3.1. The computer-implemented method of paragraph I1.3, wherein the manipulation of the user asset stored in the server is a deletion of the user asset, and the update data is configured to cause the first computing device to render the cooperative VR environment without the user asset.

I1.3. The computer-implemented method of any of paragraphs I1-I1.3.1, wherein the server is configured to store an additional user asset in an additional server database associated with the second user account associated with the second computing device, and further comprising:

receiving, from the server, additional menu data for rendering a visual representation of a graphical user interface for accessing assets within the additional server database, wherein the additional menu data does not enable the first computing device to access the additional server database.

J1. A network based computing system for providing a virtual reality environment for collaboration between multiple users, the computing system including:
   a memory;
   at least one processing unit;
   a non-transitory computer readable instructions that, when executed by the at least one processing unit causes the computing system to perform the computer-implemented method of any of paragraphs A1-I1.3.

K1. A non-transitory computer readable medium storing instructions that, when executed by a processor cause a computing device to perform the computer-implemented method of any of paragraphs A1-I1.3.

L1. The use of the network-connected device of paragraph J1.

M1. The use of the non-transitory computer readable medium of paragraph K1.

INDUSTRIAL APPLICABILITY

The systems and methods disclosed herein are applicable to network-connected devices. The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A computer-implemented method for cooperatively manipulating an asset within a cooperative virtual reality (VR) environment, the computer-implemented method comprising:
   receiving, from a server and by a first computing device, a VR file for the cooperative VR environment, the VR file including data configured to cause the first computing device to render an asset within the cooperative VR environment;
   rendering, by the first computing device and based on the VR file, the cooperative VR environment including the asset on a display associated with the first computing device;
   receiving location data indicating positional information relating to one or more VR controllers associated with a second computing device;
   rendering, by the first computing device and based on the location data, an avatar representation of a user account associated with the second computing device within the cooperative VR environment;
   receiving user input data from one or more VR controllers associated with the first computing device, wherein the user input data corresponds to one or more of a user selection and positional information of the one or more VR controllers associated with the first computing device;
   receiving additional location data indicating additional positional information relating to the one or more VR controllers associated with the second computing device; and
   determining, by the first computing device, that the user input data and the additional location data correspond to a cooperative selection of the asset within the cooperative VR environment, thereby enabling collaborative manipulation of the asset in the VR environment together by respective users of the first computing device and the second computing device.

2. The computer-implemented method of claim 1, further comprising, based on the determining that the user input data and the additional location data correspond to the cooperative selection of the asset, transmitting to the server a request to cooperatively manipulate the asset.

3. The computer-implemented method of claim 2, further comprising:
   based in part on the server assigning permission to manipulate the asset to the first computing device:
   receiving, by the first computing device, additional user input data from the one or more VR controllers associated with the first computing device, the additional user input data corresponding to manipulation of the asset;
   receiving, by the first computing device, further location data from the second computing device, the further location data indicating further positional information relating to the one or more VR controllers associated with the second computing device, the further location data corresponding to user inputs to manipulate the asset; and
   transmitting, to the server and based on the additional user input data and the further location data, additional state data that indicates the state of the asset has been cooperatively manipulated by the first computing device and the second computing device to become a cooperatively modified version of the asset.

4. The computer-implemented method of claim 3, wherein based on the transmitting the additional state data, the server updates one or more master files associated with the cooperative VR environment such that the asset within the cooperative VR environment is the cooperatively modified version of the asset.

5. The computer-implemented method of claim 3, wherein, based on the transmitting the additional state data, the server is configured to transmit to the second computing device a notification that the asset has been cooperatively manipulated by the first computing device and the second computing device to become the cooperatively modified version of the asset.

6. The computer-implemented method of claim 5, wherein the notification that the asset has been cooperatively manipulated includes state information that describes at least a positional and dimensional state of the cooperatively modified version of the asset within the cooperative VR environment.

7. The computer-implemented method of claim 4, wherein the additional state data is transmitted to the server by a second type of data channel.

8. The computer-implemented method of claim 4, wherein the additional state data further describes at least one of positional and dimensional information of the cooperatively modified version of the asset within the cooperative VR environment.

9. The computer-implemented method of claim 1, further comprising, based in part on the server assigning permission to manipulate the asset to the second computing device:
transmitting, to the second computing device, additional location data indicating additional positional information relating to the one or more VR controllers associated with the first computing device and corresponding to user selections to manipulate the asset; and
wherein, based on the additional location data indicating the additional positional information relating to the one or more VR controllers associated with the first computing device and further user inputs from the one or more VR controllers associated with the second computing device, the second computing device is configured to transmit to the server additional state data that indicates that the state of the asset has been cooperatively manipulated by the first computing device and the second computing device to become a cooperatively modified version of the asset.

10. The computer-implemented method of claim 9, wherein the additional location data indicating positional information relating to the one or more VR controllers associated with the first computing device is transmitted to the second computing device in a first type of data channel.

11. The computer-implemented method of claim 9, wherein the additional state data is transmitted to the server in a second type of data channel.

12. The computer-implemented method of claim 9, wherein the additional state data further describes at least one of positional and dimensional information of the cooperatively modified version of the asset within the cooperative VR environment.

13. The computer-implemented method of claim 1, further comprising: receiving, from the second computing device, a notification that an avatar of a user account associated with the first computing device has been translated within the cooperative VR environment rendered by the second computing device, and based on the notification that the avatar of the user account associated with the first computing device has been translated, rendering the cooperative VR environment such that a perspective of the cooperative VR environment is modified in correspondence with the translation.

14. A computer-implemented method for allowing cooperative perspective manipulation within a cooperative virtual reality (VR) environment, the computer-implemented method comprising:
receiving, from a server and by a first computing device associated with a first user account, a VR file for the cooperative VR environment, the VR file including data configured to cause the first computing device to render an asset within the cooperative VR environment;
rendering, by the first computing device and based on the VR file, the cooperative VR environment including the asset on a display associated with the first computing device;
receiving location data indicating positional information relating to one or more VR controllers associated with a second computing device;
rendering, by the first computing device and based on the location data, an avatar representation of a second user account associated with the second computing device within the cooperative VR environment;
receiving, from the second computing device, a notification that an avatar of the first user account has been translated by the second user account within the cooperative VR environment rendered by the second computing device, and
based on the notification that the avatar of the first user account has been translated, rendering the cooperative VR environment such that a perspective of the cooperative VR environment is modified in correspondence with the translation, wherein the translation is movement of the avatar of the first user account to a new virtual location within the cooperative VR environment.

15. The computer-implemented method of claim 14, further comprising: receiving additional user input data from one or more VR controllers associated with the first computing device, wherein the additional user input data indicates a gesture corresponding to a translation of the avatar associated with the second user account; and based on the additional user input data, transmitting a notification that the avatar of the second user account has been translated by the first user account within the cooperative VR environment rendered by the first computing device, wherein the notification causes the second computing device to render the cooperative VR environment such that a perspective of the cooperative VR environment is modified in correspondence with the translation of the avatar by the first user account.

16. A computer-implemented method for manipulating a perspective of an additional user account within a cooperative virtual reality (VR) environment, the computer-implemented method comprising:
receiving, from a server and by a first computing device associated with a user account, a VR file for the cooperative VR environment, the VR file including data configured to cause the first computing device to render an asset within the cooperative VR environment;
rendering, by the first computing device and based on the VR file, the cooperative VR environment including the asset on a display associated with the first computing device;

receiving location data indicating positional information relating to one or more VR controllers associated with a second computing device;

rendering, by the first computing device and based on the location data, an avatar representation of an additional user account associated with the second computing device within the cooperative VR environment;

receiving additional user input data from one or more VR controllers associated with the first computing device, wherein the additional user input data indicates a gesture corresponding to a translation of the avatar associated with the additional user account; and based on the additional user input data, transmitting a notification that the avatar of the additional user account has been translated by the user account within the cooperative VR environment rendered by the first computing device, wherein the notification causes the second computing device to render the cooperative VR environment such that a perspective of the cooperative VR environment is modified in correspondence with the translation of the avatar by the user account, wherein the translation is movement of the avatar associated with the additional user account to a new virtual location within the cooperative VR environment.

17. The computer-implemented method of claim 16, wherein the server is configured to store a user asset in a server database associated with the user account, and further comprising receiving, from the server and by the first computing device, menu data for rendering a graphical user interface for accessing the server database associated with the user account.

* * * * *